(12) United States Patent
Jeon et al.

(10) Patent No.: US 11,937,302 B2
(45) Date of Patent: *Mar. 19, 2024

(54) DEVICES AND METHODS FOR ELAA MULTI-CARRIER LBT

(71) Applicant: Apple Inc., Cupertino, CA (US)

(72) Inventors: Jeongho Jeon, San Jose, CA (US);
Abhijeet Bhorkar, Fremont, CA (US);
Seunghee Han, San Jose, CA (US);
Hwan-Joon Kwon, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,223

(22) Filed: Aug. 12, 2022

(65) Prior Publication Data

US 2022/0394770 A1 Dec. 8, 2022

Related U.S. Application Data

(63) Continuation of application No. 16/321,812, filed as application No. PCT/US2017/031953 on May 10, 2017, now Pat. No. 11,606,817.

(Continued)

(51) Int. Cl.
*H04W 74/08* (2009.01)
*H04W 74/00* (2009.01)
*H04L 1/1812* (2023.01)

(52) U.S. Cl.
CPC ..... *H04W 74/0816* (2013.01); *H04W 74/006* (2013.01); *H04L 1/1812* (2013.01); *H04W 74/0808* (2013.01)

(58) Field of Classification Search
CPC .......... H04W 74/0816; H04W 74/006; H04W 74/0808; H04L 1/1812; H04L 1/1816
(Continued)

(56) References Cited

U.S. PATENT DOCUMENTS

2012/0120888 A1 5/2012 Miao et al.
2014/0362780 A1* 12/2014 Malladi ............... H04W 72/542
370/329

(Continued)

FOREIGN PATENT DOCUMENTS

WO 2016081375 5/2016
WO 2016130073 8/2016

OTHER PUBLICATIONS

"International Application Serial No. PCT/US2017/031953, International Search Report dated Aug. 24, 2017", 3 pgs.
(Continued)

*Primary Examiner* — Candal Elpenord
(74) *Attorney, Agent, or Firm* — Kowert, Hood, Munyon, Rankin & Goetzel, P.C.

(57) ABSTRACT

Devices, methods, user equipment (UE), evolved node B (eNB), and storage media are described suitable for coexistence operations for uplink communications on multiple unlicensed carriers. Various embodiments are implemented in LTE systems with license-assisted access (LAA) associated communications. In one embodiment, a UE processes one or more uplink grants from an eNB scheduling transmissions on multiple unlicensed carriers at a first time, and indicating a first channel access procedure. The UE then selects a first unlicensed carrier and performs the first channel access procedure, and performs a second channel access procedure on a second unlicensed carrier of the multiple unlicensed carriers.

22 Claims, 10 Drawing Sheets

Related U.S. Application Data

(60) Provisional application No. 62/378,052, filed on Aug. 22, 2016.

(58) Field of Classification Search
USPC .................................................. 370/329–330
See application file for complete search history.

(56) References Cited

U.S. PATENT DOCUMENTS

| | | |
|---|---|---|
| 2017/0013469 A1 | 1/2017 | Larsson et al. |
| 2017/0079013 A1 | 3/2017 | Noh et al. |
| 2017/0105207 A1 | 4/2017 | Fan et al. |
| 2017/0188387 A1 | 6/2017 | Mukherjee et al. |
| 2017/0339719 A1* | 11/2017 | Xu .................. H04W 74/08 |
| 2018/0027549 A1 | 1/2018 | Wang et al. |
| 2018/0091979 A1 | 3/2018 | Yang et al. |
| 2018/0213563 A1 | 7/2018 | Yang et al. |
| 2018/0235007 A1 | 8/2018 | Gou et al. |
| 2018/0255578 A1* | 9/2018 | Kim .................. H04L 5/001 |
| 2018/0317255 A1 | 11/2018 | Um et al. |
| 2018/0376506 A1 | 12/2018 | Hu et al. |
| 2019/0007972 A1 | 1/2019 | Gou et al. |
| 2019/0037601 A1* | 1/2019 | Noh .................. H04L 1/1887 |
| 2019/0044634 A1 | 2/2019 | Cui et al. |
| 2019/0045528 A1 | 2/2019 | Xu et al. |
| 2020/0236703 A1* | 7/2020 | Amuru .................. H04W 74/02 |
| 2021/0368485 A1* | 11/2021 | Zhang .............. H04W 74/0808 |

OTHER PUBLICATIONS

"International Application Serial No. PCT/US2017/031953, Written Opinion dated Aug. 24, 2017", 6 pgs.

Catt, "LBT for LAA multi-carrier transmission in LAA DL", R1-153921, 3GPP TSG RAN WG1 Meeting #82bis, Beijing, China, (Aug. 15, 2015).

Intel, Corporation, "On the starting and ending positions for DL LAA burst", R1-156515, 3GPP TSG-RAN2 #89bis, Bratislava, Slovakia, (Nov. 7, 2015).

* cited by examiner

DEVICES AND METHODS FOR ELAA MULTI-CARRIER LBT

PRIORITY CLAIM

This application is a continuation of U.S. application Ser. No. 16/321,812, filed Jan. 29, 2019, which is a U.S. National Stage Filing under 35 U.S.C. 371 from International Application No. PCT/US2017/031953, filed May 10, 2017, which claims the benefit of priority to U.S. Provisional Patent Application Ser. No. 62/378,052 filed Aug. 22, 2016, and entitled "UPLINK MLJL TI-CARRIER LBT FOR LTE ELAA," which are incorporated herein by reference in their entirety.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to systems, methods, and component devices for wireless communications, and particularly to the integration of long-term evolution (LTE), LTE-Advanced, and other similar wireless communication systems with unlicensed frequencies.

BACKGROUND

LTE and LTE-Advanced are standards for wireless communication of high-speed data for user equipment (UE) such as mobile telephones. In LTE-Advanced and various wireless systems, carrier aggregation is a technology where multiple carrier signals operating on different frequencies may be used to carry communications for a single UE, thus increasing the bandwidth available to a single device. Repeat requests may be used in some systems to verify the integrity of transmitted data, and in some systems, carrier aggregation may be used where one or more component carriers operate on unlicensed frequencies.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
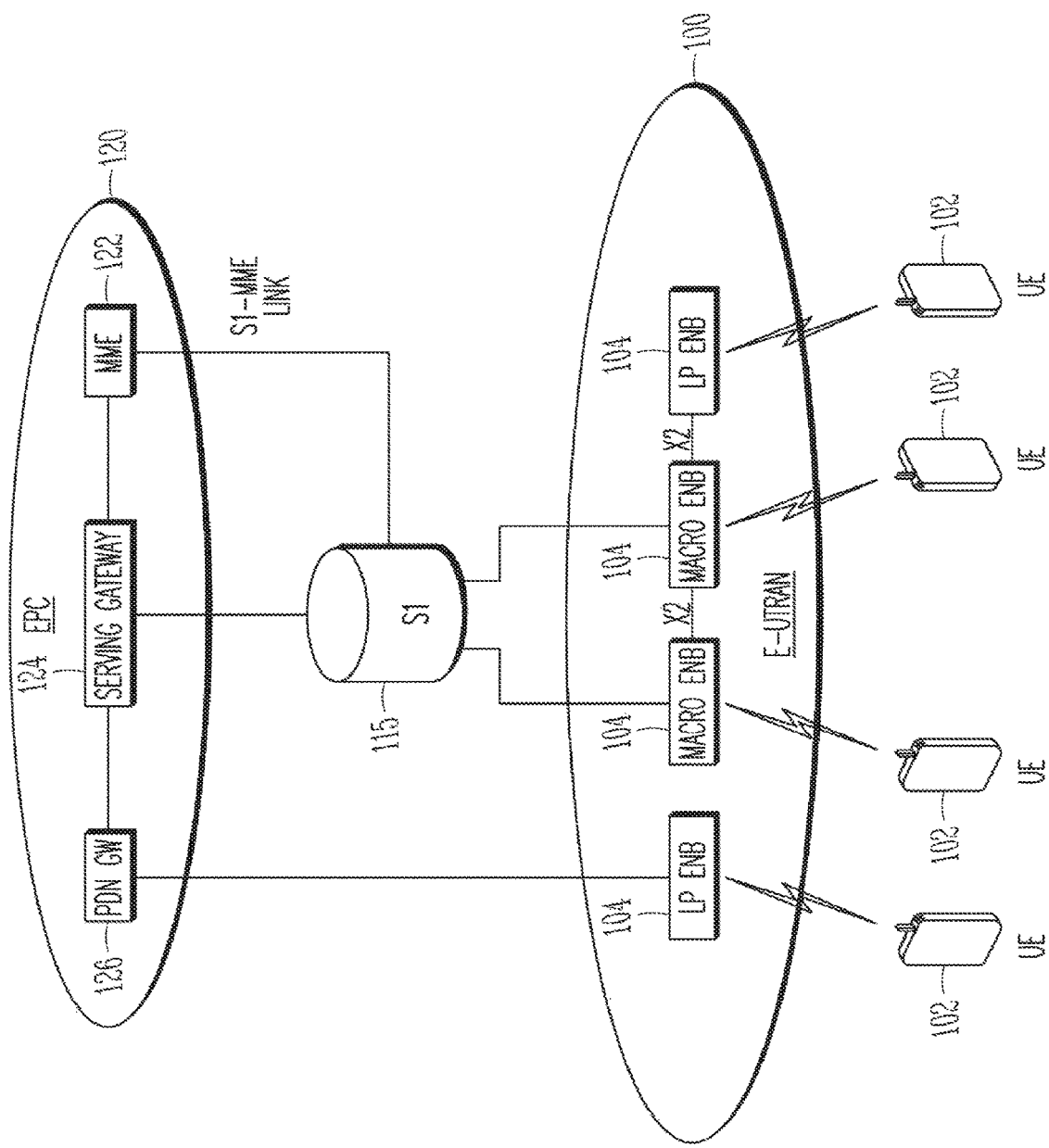
FIG. 1 is a functional diagram of a wireless network, in accordance with some embodiments.

FIG. 1 shows an example of a portion of an end-to-end network architecture of a network (e.g., an LTE network) with various components of the network, in accordance with some embodiments. Such a network architecture may be used to implement enhanced license-assisted access (ELAA) operations to enable wireless communication over unlicensed communication frequencies. Some communications between eNBs 104 and UEs 102 include uplink communications on multiple unlicensed channels using coexistence operations, in accordance with the embodiments described herein. Various embodiments may be used in an LTE network which supports operations on unlicensed frequencies, such as the networks of FIGS. 1-2, or in any other such communication network. As used herein, "LTE network" refers to both LTE and LTE Advanced (LTE-A) networks, as well as other versions of LTE networks in development, such as 4G and 5G LTE networks. The network may comprise a radio access network (RAN) (e.g., as depicted, the Evolved Universal Terrestrial Radio Access Network (E-UTRAN)) 100 and a core network 120 (e.g., shown as an evolved packet core (EPC)) coupled together through an S1 interface 115. For convenience and brevity, only a portion of the core network 120, as well as the RAN 100, is shown in the example.

The core network 120 may include a mobility management entity (MME) 122, a serving gateway (S-GW) 124, and a packet data network gateway (PDN GW) 126. The RAN 100 may include evolved nodeBs (eNBs) 104 (which may operate as base stations) for communicating with user equipments (UEs) 102. The eNBs 104 may include macro eNBs 104a and low-power (LP) eNBs 104b. The eNBs 104 and UEs 102 may employ the techniques described herein.

The MME 122 may be similar in function to the control plane of legacy Serving General Packet Radio Service (GPRS) Support Nodes (SGSN). The MME 122 may manage mobility aspects in access such as gateway selection and tracking area list management. As part of such operations, the MME 122 assists with providing context information describing a particular UE 102 from S-GW 124 to an eNB 104 to enable the particular UE 102 to connect to the eNB 104. Such context information may be used by the eNBs 104 to assist with determining functionality and various operations in establishing a connection (e.g., Radio Resource Control (RRC) connections) between the eNB 104 and a particular UE 102.

The S-GW 124 may terminate the interface toward the RAN 100, and route data packets between the RAN 100 and the core network 120. In addition, the S-GW 124 may be a local mobility anchor point for inter-eNB handovers and also may provide an anchor for inter-3GPP mobility. Other responsibilities may include lawful intercept, charging, and some policy enforcement. As part of this functionality, at least a portion of the context information described above may be stored at the S-GW 124, and communicated or adjusted in communication with the MME 122. In various embodiments, the S-GW 124 and the MME 122 may be implemented in one physical node or separate physical nodes.

The PDN GW 126 may terminate an SGi interface (e.g. a 3GPP LTE SGi interface) toward an external packet data network (PDN). The PDN GW 126 may route data packets between the core network 120 and the external PDN, and may perform policy enforcement and charging data collection. The PDN GW 126 may also provide an anchor point for mobility devices with non-LTE access. The external PDN can be any kind of internet protocol (IP) network, as well as an IP Multimedia Subsystem (IMS) domain. The PDN GW 126 and the S-GW 124 may be implemented in a single physical node or separate physical nodes.

The eNBs 104 (macro and LP) may terminate the air interface protocol and may be the first point of contact for a UE 102. In some embodiments, an eNB 104 may fulfill various logical functions for the RAN 100 including, but not limited to, radio network controller (RNC) functions such as radio bearer management, uplink and downlink dynamic radio resource management and data packet scheduling, and mobility management. In accordance with some embodiments, the UEs 102 may be configured to communicate orthogonal frequency division multiplexed (OFDM) communication signals with an eNB 104 over a multi-carrier communication channel in accordance with an orthogonal frequency-division multiple access (OFDMA) communication technique. The OFDM signals may comprise a plurality of orthogonal subcarriers.

The S1 interface 115 may be the interface that separates the RAN 100 and the core network 120. It may be split into two parts: the S1-U, which may carry traffic data between the eNBs 104 and the S-GW 124, and the S1-MME, which may be a signaling interface between the eNBs 104 and the MME 122. An X2 interface may be the interface between pairs of the eNBs 104. The X2 interface may comprise two parts, the X2-C and X2-U. The X2-C may be the control-plane interface between the eNBs 104, while the X2-U may be the user-plane interface between the eNBs 104.

In cellular networks, the LP eNBs 104*b* in some embodiments is used to extend coverage to indoor areas where outdoor signals do not reach well, or to add network capacity in areas with dense usage. In particular, it may be desirable to enhance the coverage of a wireless communication system using cells of different sizes, such as macrocells, microcells, picocells, and femtocells, to boost system performance. The cells of different sizes may operate on the same frequency band, or may operate on different frequency bands with each cell operating on a different frequency band or only cells of different sizes operating on different frequency bands. As used herein, the term "LP eNB" refers to any suitable relatively LP eNB for implementing a smaller cell (smaller than a macrocell) such as a femtocell, a picocell, or a microcell. Femtocell eNBs are, in some embodiments, provided by a mobile network operator to its residential or enterprise customers. A femtocell, in some embodiments, is the size of a residential gateway or smaller and may generally connect to a broadband line. The femtocell may connect to the mobile operator's mobile network and provide extra coverage in a range of 30 to 50 meters. Thus, an LP eNB 104*b* might be a femtocell eNB since it is coupled through the PDN GW 126. Similarly, a picocell may be a wireless communication system covering a small area, such as in-building (offices, shopping malls, train stations, etc.), or more recently, in-aircraft. A picocell eNB may generally connect through the X2 link to another eNB such as a macro eNB through its base station controller (BSC) functionality. Thus, an LP eNB 104*b* may be implemented with a picocell eNB since it may be coupled to a macro eNB 104*a* via an X2 interface. Picocell eNBs or other such devices may incorporate some or all functionality of a macro eNB 104*a* or LP eNB 104*b*. In some cases, this may be referred to as an access point base station or enterprise femtocell.

Communication over an LTE network may be split up into 10 ms radio frames, each of which may contain ten 1 ms subframes. Each subframe of the frame, in turn, may contain two slots of 0.5 ms. Each subframe may be used for uplink (UL) communications from the UE 102 to the eNB 104 or downlink (DL) communications from the eNB 104 to the UE 102. In one embodiment, the eNB 104 may allocate a greater number of DL communications than UL communications in a particular frame. The eNB 104 may schedule transmissions over a variety of frequency bands. Each slot of the subframe may contain 6-7 OFDM symbols, depending on the system used. In one embodiment, each subframe may contain 12 subcarriers. In the 5G system, however, the frame size (in ms), the subframe size, and the number of subframes within a frame, as well as the frame structure, may be different from those of a 4G or LTE system. The subframe size, as well as the number of subframes in a frame, may also vary in the 5G system from frame to frame. For example, while the frame size may remain at 10 ms in the 5G system for downward compatibility, the subframe size may be decreased to 0.2 ms or 0.25 ms to increase the number of subframes in each frame.

A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit m a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. An RB in some embodiments may be 180 kHz wide in frequency and one slot long in time. In frequency, RBs may be either 12×15 kHz subcarriers or 24×7.5 kHz subcarriers wide, dependent on the system bandwidth. In Frequency Division Duplexing (FDD) systems, both the uplink and downlink frames may be 10 ms and frequency (full-duplex) or time (half-duplex) separated. The duration of the resource grid in the time domain corresponds to one subframe or two resource blocks. Each resource grid may comprise 12 (sub-carriers)×14 (symbols)=168 resource elements.

Each OFDM symbol may contain a cyclic prefix (CP) which may be used to effectively eliminate Inter Symbol Interference (ISI), and a Fast Fourier Transform (FFT)

period. The duration of the CP may be determined by the highest anticipated degree of delay spread. Although distortion from the preceding OFDM symbol may exist within the CP, with a CP of sufficient duration, preceding OFDM symbols do not enter the FFT period. Once the FFT period signal is received and digitized, the receiver may ignore the signal in the CP.

There may be several different 5G physical downlink channels that are conveyed using such resource blocks, including the 5G physical downlink control channel (xPDCCH) and the 5G physical downlink shared channel (xPDSCH). Each downlink subframe may be partitioned into the xPDCCH and the xPDSCH, and perhaps additional signals, as discussed below. The xPDCCH may occupy the first two symbols of each subframe and carry, among other information, information about the transport format and resource allocations related to the xPDSCH channel, as well as allocation and hybrid automatic repeat request (HARQ) information related to the 5G physical uplink shared channel (xPUSCH). The xPDSCH may carny user data and higher-layer signaling to a UE and, in some embodiments, occupy the remainder of the subframe. In some systems, downlink scheduling (assigning control and shared channel resource blocks to UEs within a cell) may be performed at the eNB based on channel quality information provided from the UEs to the eNB, and then the downlink resource assignment information may be sent to each UE on the xPDCCH used for (assigned to) the UE. The xPDCCH may contain downlink control information (DCI) in one of a number of formats that indicate to the UE how to find and decode data, transmitted on the xPDSCH in the same subframe, from the resource grid. The DCI format may provide details such as a number of resource blocks, resource allocation type, modulation scheme, transport block, redundancy version, coding rate, etc. Each DCI format may have a cyclic redundancy code (CRC) and be scrambled with a Radio Network Temporary Identifier (RNTI) that identifies the target UE for which the xPDSCH is intended. Use of the UE-specific RNTI may limit decoding of the DCI format (and hence the corresponding xPDSCH) to only the intended UE.

Figure 2:
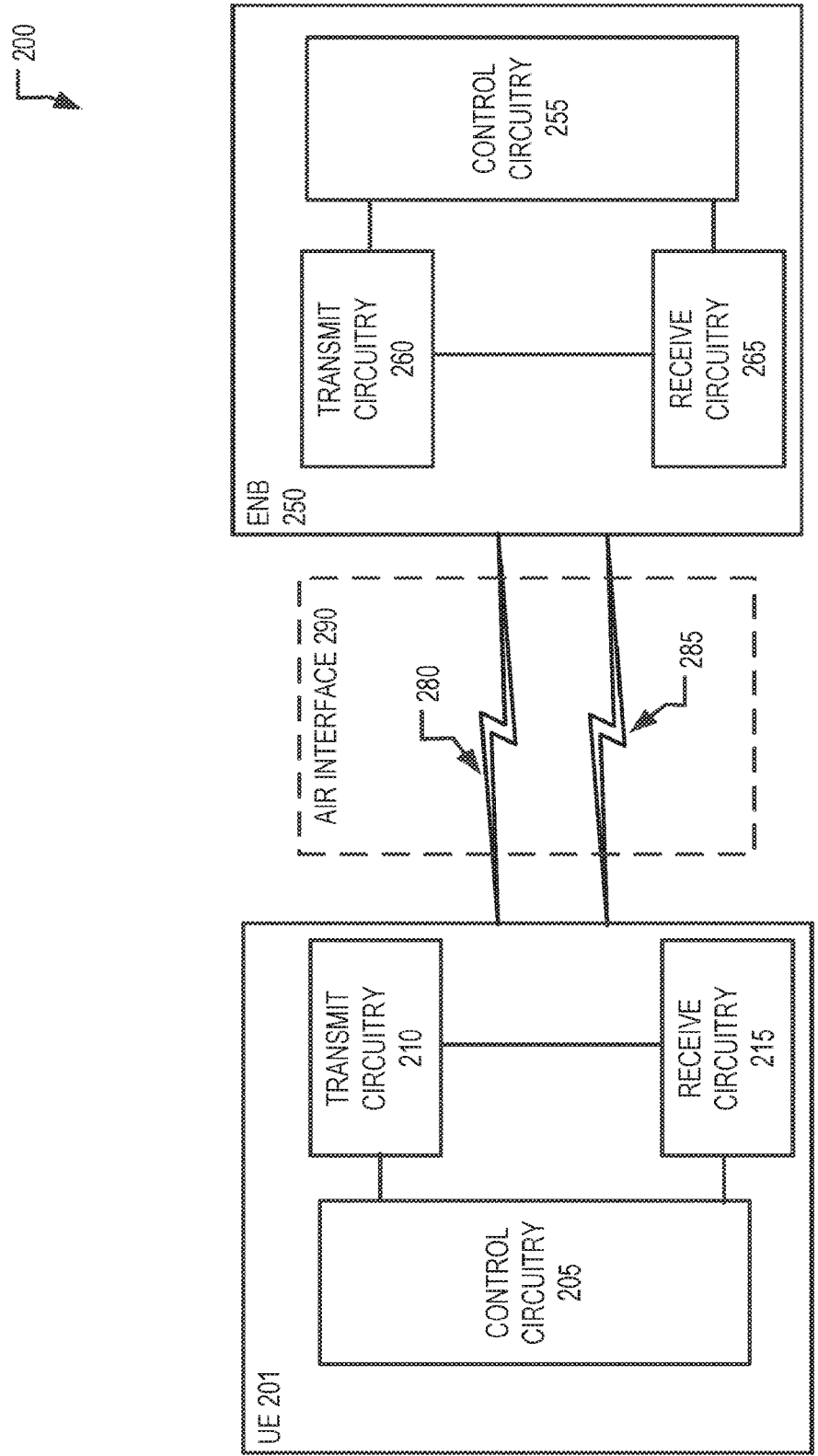
FIG. 2 illustrates components of a wireless communication network, in accordance with some embodiments.

FIG. 2 illustrates a wireless network 200, in accordance with some embodiments. The wireless network 200 includes a UE 201 and an eNB 250 connected via one or more channels 280, 285 across an air interface 290. The UE 201 and eNB 250 communicate using a system that supports controls for managing the access of the UE 201 to a network via the eNB 250.

In the wireless network 200, the UE 201 and any other UE in the system may be, for example, laptop computers, smartphones, tablet computers, printers, machine-type devices such as smart meters or specialized devices for healthcare monitoring, remote security surveillance systems, intelligent transportation systems, or any other wireless devices with or without a user interface. The eNB 250 provides the UE 201 network connectivity to a broader network (not shown). This UE 201 connectivity is provided via the air interface 290 in an eNB service area provided by the eNB 250. In some embodiments, such a broader network may be a wide area network operated by a cellular network provider, or may be the Internet. Each eNB service area associated with the eNB 250 is supported by antennas integrated with the eNB 250. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the eNB 250, for example, includes three sectors, each covering an approximately 120-degree area, with an array of antennas directed to each sector to provide 360-degree coverage around the eNB 250.

The UE 201 includes control circuitry 205 coupled with transmit circuitry 210 and receive circuitry 215. The transmit circuitry 210 and receive circuitry 215 may each be coupled with one or more antennas. The control circuitry 205 may be adapted to perform operations associated with wireless communications using congestion control. The control circuitry 205 may include various combinations of application-specific circuitry and baseband circuitry. The transmit circuitry 210 and receive circuitry 215 may be adapted to transmit and receive data, respectively, and may include radio frequency (RF) circuitry or front end module (FEM) circuitry. In various embodiments, aspects of the transmit circuitry 210, receive circuitry 215, and control circuitry 205 may be integrated in various ways to implement the circuitry described herein. The control circuitry 205 may be adapted or configured to perform various operations such as those described elsewhere in this disclosure related to a UE. The transmit circuitry 210 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 210 may be configured to receive block data from the control circuitry 205 for transmission across the air interface 290. Similarly, the receive circuitry 215 may receive a plurality of multiplexed downlink physical channels from the air interface 290 and relay the physical channels to the control circuitry 205. The plurality of downlink physical channels may be multiplexed according to TDM or FDM along with carrier aggregation. The transmit circuitry 210 and the receive circuitry 215 may transmit and receive both control data and content data (e.g., messages, images, video, etc.) structured within data blocks that are carried by the physical channels. For a device configured for low-bandwidth or irregular communications (e.g., utility meters, stationary sensors, etc.), customized circuitry and antennas may be used to enable communications on a narrow bandwidth (e.g., 180 kHz, or other similar narrow bandwidths) to enable the device to consume small amounts of network resources.

FIG. 2 also illustrates the eNB 250, in accordance with various embodiments. The eNB 250 circuitry may include control circuitry 255 coupled with transmit circuitry 260 and receive circuitry 265. The transmit circuitry 260 and receive circuitry 265 may each be coupled with one or more antennas that may be used to enable communications via the air interface 290.

The control circuitry 255 may be adapted to perform operations for managing channels and congestion control communications used with various UEs, including communication of open mobile alliance (OMA) management objects (OMA-MOs) describing application categories, as detailed further below. The transmit circuitry 260 and receive circuitry 265 may be adapted to transmit and receive data, respectively, to any UE connected to the eNB 250. The transmit circuitry 260 may transmit downlink physical channels comprised of a plurality of downlink subframes. The receive circuitry 265 may receive a plurality of uplink physical channels from various UEs including the UE 201. In embodiments described herein, the receive circuitry 265 may receive a plurality of uplink physical channels simultaneously on multiple unlicensed-frequency channels from a single UE.

For wireless network implementations such as those illustrated by FIGS. 1 and 2, there is an increasing demand for high data rates over wireless, but the usable licensed spectrum is of limited physical extent. This is the rationale behind the emerging interest in the operation of LTE systems in the unlicensed spectrum in the 3rd Generation Partnership Project (3GPP), which is called LTE License-Assisted Access (LAA). Initially, 3GPP will use the unlicensed band as a secondary downlink component carrier while keeping the licensed band as the primary carrier for connectivity and QoS support.

One unlicensed frequency band of interest in 3GPP is the 5 GHz band, which has wide spectrum with global common availability. Although it is designated as unlicensed or licensed-exempt spectrum, the radio equipment is certified to meet certain regulatory requirements. The 5 GHz band in the US is governed by Unlicensed National Information Infrastructure (U-NII) rules by the Federal Communications Commission (FCC). The LTE LAA design should and will consider the coexistence issue with incumbent systems. The Wireless Local Area Networks (WLANs) based on IEEE 802.11n/ac standards operate in the U-NII bands. Since the WLANs are widely deployed both by individuals and operators for carrier-grade access service and data offloading, care is designed into the system when deploying LAA. Coexistence with other network communication systems is thus a goal when extending 3GPP communications to unlicensed frequencies. Listen-before-talk (LBT) is a coexistence feature of LTE LAA systems, and is a procedure whereby radio transmitters first sense the medium and transmit only if the medium is sensed to be idle.

In various systems. LAA is based on the carrier aggregation capability in LTE-A, which enables transmission and reception over multiple component carriers in parallel. The use of unlicensed frequencies, however, involves additional complexities beyond those of licensed frequencies where no coexistence is needed, because licensed use enables an expectation that the licensed channels will be available or managed by a single system. In unlicensed channels, unexpected use from other systems may occur at any time, and so the use of more than one unlicensed secondary carrier adds additional complexity above the use of a single unlicensed secondary carrier. Although the LAA LBT procedure is well defined for single secondary unlicensed carriers, possible options for the LBT procedure and channel bonding rule need to be clarified for LTE LAA multi-carrier operation where multiple unlicensed channels are used by 3GPP communications systems (e.g., a single UE transmitting on multiple unlicensed carriers or channels at the same time).

Systems for DL multi-carrier LBT operations are described below.

For multi-carrier LBT on a group carrier, in a first alternative (Alt1), an eNB performs a category 4 (Cat-4; e.g., an LBT procedure using or based on LBT procedures standardized as category 4 European Telecommunications Standards Institute (ETSI) LBT procedures) based LBT on only one unlicensed carrier. In some embodiments, the eNB chooses the carrier for Cat-4 based LBT uniformly randomly before each transmission burst or fixes the carrier for at least one second. The energy detection threshold used on channels not performing Cat-4 based LBT is the same as the one used on channels performing Cat-4 based LBT. A single backoff counter is used for the carrier on which Cat-4 based LBT is performed. An eNB can use the following Option 1 or Option 2. Option 1: One contention window (CW) size is updated based on HARQ feedback for all the carriers. Option 2: The CW size is updated independently per carrier. The largest CW size among the carriers is used to draw the backoff counter.

In a second alternative (Alt2), an eNB performs Cat-4 based LBT on more than one unlicensed carrier. The eNB is allowed to transmit DL data burst(s) on the carriers that have completed Cat-4 based LBT with potential self-deferral (e.g., including idle sensing for a single interval) to align transmission over multiple carriers. The eNB can perform a CW window update independently for Cat-4 based LBT on more than one unlicensed carrier. The eNB can use independent backoff counters or can use a common backoff counter for multiple carriers. When a common backoff counter is used, the common random number shall be drawn based on the largest CW size of the carriers which were used in prior transmissions. In the absence of any other technology sharing, access the carrier cannot be guaranteed on a long-term basis (e.g., by level of regulation) in order to avoid excluding other systems from an unlicensed channel. If a common random counter is used, then after transmission of DL data burst(s) over one or multiple carriers, some embodiments operate to reset the extended clear channel assessment (CCA) counter(s) for all channel(s) on which LBT was performed. In some embodiments, if independent random counters are used, then after the transmission of DL data burst(s) over one or multiple carriers, the system may do one of the following: wait for a duration of 4 CCA slots before resuming the countdown of counters for all the activated LAA small cell(s) (Scell(s)) for the UE(s) which were scheduled in the burst; and/or reset the counters for all the activated LAA Scell(s) for the UE(s) which were scheduled in the burst.

In various systems, the decision between the two options above can be made by the eNB dynamically (e.g., after drawing a random number) on a per-carrier basis.

In the above arrangements, Alt1 is similar to the IEEE 802.11ac channel sensing operation, wherein there is a notion of a primary channel and secondary channels, and wherein the carrier sensing requiring random backoff is performed only on the primary channel and the single interval sensing is applied on the secondary channels. On the other hand, Alt2 is more flexible, which allows independent channel sensing for each configured SCell.

Embodiments herein relate to UL multi-carrier LBT to be performed by a UE. In some embodiments, the UL multi-carrier LBT to be performed by the UE is based on the DL multi-carrier operations described above. The UL operations, however, involve additional complexity due to the UL transmissions being scheduled by the eNB. Whereas in the DL operations, the eNB schedules and then transmits on its own, for a UL operation, the eNB schedules the UL communications, and then communicates the scheduling to the UE. The UE then attempts to transmit at the scheduled time, but may be delayed if the scheduled unlicensed channels are occupied by another system during the scheduled UL transmission from the UE.

In various embodiments, different UL multi-carrier LBT types (e.g., A1, A2, B1, B2, described below) are signaled by the eNB. The signaling can be via a UL grant or via RRC configuration communications from the eNB to a UE. In other embodiments, the multi-carrier LBT type (A1, A2, B1, B2) is selected by the UE. In some embodiments, the contention window size (CWS) is signaled by the eNB, if the CWS is maintained by the eNB. In some embodiments, if the UE maintains the CWS, the CWS is not signaled by the eNB. In certain embodiments, when type B multi-carrier LBT is used, the eNB can signal the carrier to perform Cat-4 LBT. Alternatively, the UE may autonomously select the carrier to perform Cat-4 LBT by itself.

The various multi-carrier LBT operations can be categorized as follows.

Type A: each carrier maintains CWS independently and performs a Cat-4 channel access procedure. Type A1: if the absence of any other technology sharing the carrier cannot be guaranteed on a long-term basis (e.g., by level of regulation), after the eNB transmits on any carrier, the eNB can resume decrementing the counter either after waiting for 4 CCA slots or after reinitializing the counter. Type A2: The counter for each carrier is generated using the maximum CWS among all the carriers, and the counter is reinitialized after a transmission on any carrier.

Type B: one carrier is selected randomly or semi-statically from the group of carriers to perform Cat-4 LBT before transmission; another carrier can start transmission simultaneously if it succeeds with a 25 microsecond (μs) LBT before the transmission. Type B1: a single CWS is maintained for the group of carriers, and the CWS adaptation is based on the HARQ-ACK feedback on all the carriers within the group. Type B2: CWS is maintained independently on each carrier based on the HARQ-ACK feedback on that carrier only. The random counter for the Cat-4 LBT on the selected carrier is chosen based on the maximum CWS among all the carriers.

Thus, UL multi-carrier LBT may be performed using the various types of LBT described above. In accordance with some systems, in one embodiment, the multi-carrier LBT to be performed by the UE uses all or some of the abovementioned LBT types (A1, A2, B1, B2) supported for enhanced LAA (ELAA) UL multi-carrier LBT.

In one embodiment, the multi-carrier LBT type (A1, A2, B1, B2) is signaled by the eNB. In various embodiments, if all the four types are supported, then the signaling will indicate one out of the four. If only some of the types are supported, (e.g., A1 and B2 only), then in some embodiments the signaling will be one out of two. The signaling can be via UL grant. The signaling can also be via RRC configuration. In some embodiments described in more detail below, a UE can select the LBT type by itself.

In one embodiment, the CWS is signaled by the eNB, if the CWS is maintained by the eNB. In another embodiment, if the UE maintains the CWS, the CWS is not signaled by the eNB. In another embodiment, when type B multi-carrier LBT is used, the eNB can signal the carrier to perform Cat-4 LBT. In another embodiment, a UE may autonomously select the carrier to perform Cat-4 LBT by itself.

Figure 3:
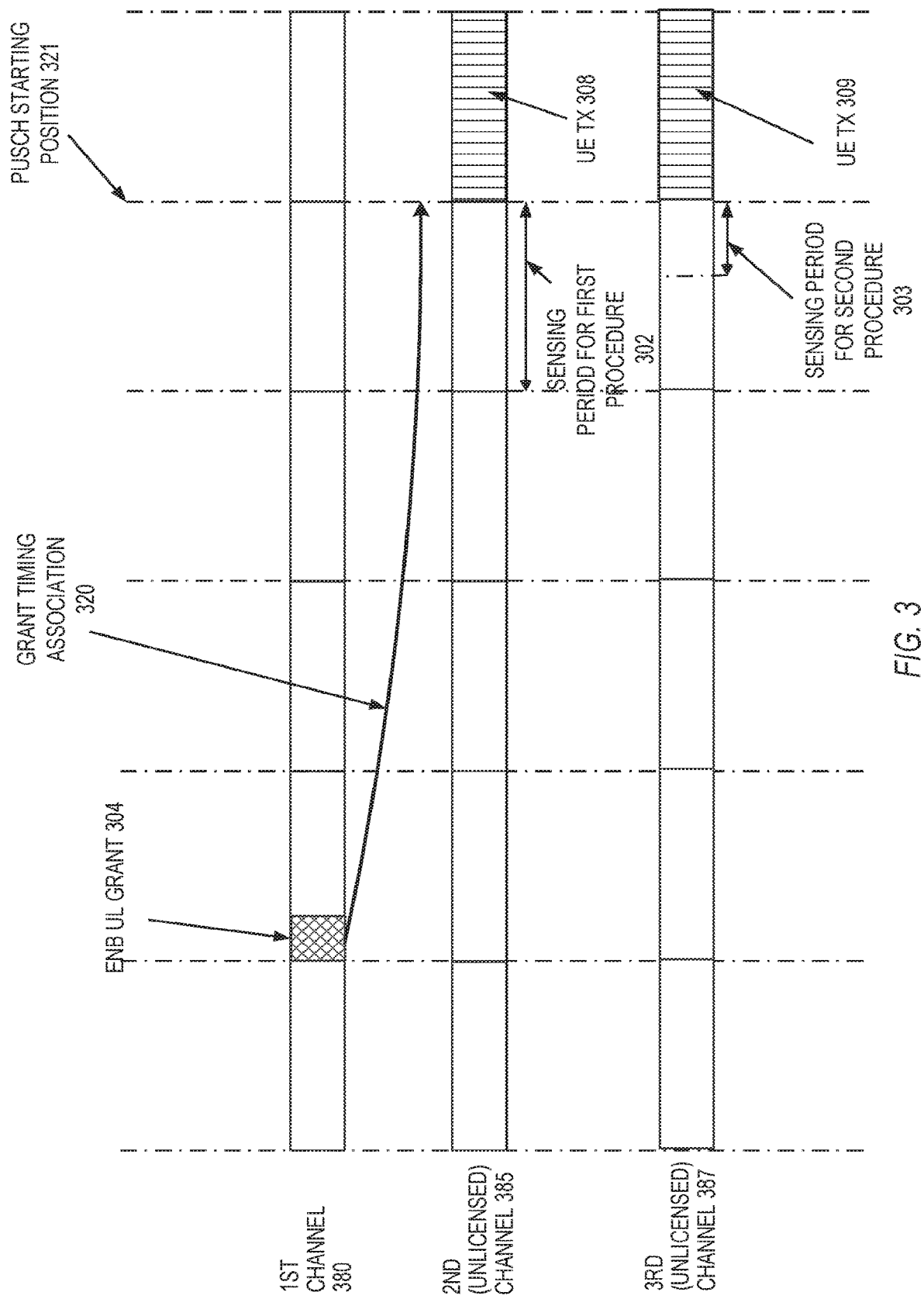
FIG. 3 illustrates aspects of coexistence operations for multi-carrier operation on multiple unlicensed channels, in accordance with some embodiments.

FIG. 3 illustrates aspects of coexistence operations for multi-carrier operation on multiple unlicensed channels, in accordance with some embodiments. FIG. 3 shows system usage by an eNB and a UE on three channels 380, 385, and 387. The first channel 380 is a licensed channel and operates as the primary channel for communicating UL grants from the eNB to the UE, as well as other primary channel control information. The second channel 385 and third channel 387 are both unlicensed channels identified for use in communicating information between the eNB and the UE. In the operations illustrated by FIG. 3, the eNB transmits a UL grant to the UE in the channel usage shown as an eNB UL grant 304. The eNB UL grant 304 includes a grant timing association 320 that identifies a physical uplink shared channel (PUSCH) starting position 321. The PUSCH starting position 321 is the time at which the UE is scheduled by the eNB to begin transmissions on the second and third channels 385 and 387. Because the second and third channels 385 and 387 are unlicensed channels, coexistence procedures are used before the UE transmits. As described above, various different coexistence procedures may be used. In the embodiment of FIG. 3, the UE uses different coexistence procedures for the second channel 385 and the third channel 387. A first sensing period for a first procedure 302 is used with the second channel 385 prior to a UE transmission (Tx) 308 on the second channel 385, and a second sensing period for a second procedure 303 is used before a UE transmission (Tx) 309 on the third channel 387. In the illustrated embodiment of FIG. 3, the UE transmissions 308 and 309 from the UE to the eNB begin at the PUSCH starting position 321 identified by the eNB UL grant 304 if the corresponding coexistence procedures do not identify any other use of the channel during the sensing periods. If other usage of the channel (e.g., Wi-Fi® or other unlicensed channel usage) is identified during the sensing periods, then the UE transmissions 308 and 309 are delayed, depending on the particulars of the sensed communications on a particular channel.

As described above, in some embodiments, the eNB may particularly identify the coexistence procedures to be used. In other embodiments, the UE may maintain some control over the used coexistence procedures. For example, the eNB UL grant 304 may identify a PUSCH starting position 321 for transmission of PUSCH UL communications on two or more unlicensed channels and specify the use of a complex coexistence procedure (e.g., a Cat-4 LBT procedure). The UE may then select one of the channels to perform the complex LBT procedure (e.g., with the sensing period for the first procedure 302, which takes more time) and use a simpler coexistence procedure (e.g., a Cat-2 or fixed-time LBT procedure which takes less time than the Cat-4 procedure) for the other unlicensed channels. In such a system, the UE may transmit on the channel where the more complex LBT procedure is used even if the less complex procedure on a different channel identifies channel usage by another device. The UE may not transmit on any unlicensed channel, however, if any use by another device is sensed on the channel performing the first complex sensing procedure.

For example, if during the sensing period for the first procedure 302, the UE identifies another device using the second channel 385, but no use is sensed on the third channel 387 during the sensing period for the second procedure 303, then both UE transmissions 308 and 309 are delayed until the first procedure identifies that the second channel 385 is free. The sensing of the third channel 387 may continue to verify that the third channel 387 continues to be free during the delay caused by another device using the second channel 385 during the sensing period for the first procedure 302.

If, however, use of the third channel 387 is identified during the sensing period for the second procedure 303, but no use of the second channel 385 is sensed during the sensing period for the first procedure 302, the UE may perform the UE transmission 308 starting at the PUSCH starting position 321 while delaying the UE transmission 309 until the third channel 387 is free. In such embodiments, the LBT procedure used on the third channel 387 may remain the simplified LBT procedure, or the UE may switch to using a more complex LBT operation (e.g., Cat-4 operations or other operations with a variable CW or a backoff timer).

Figure 4:
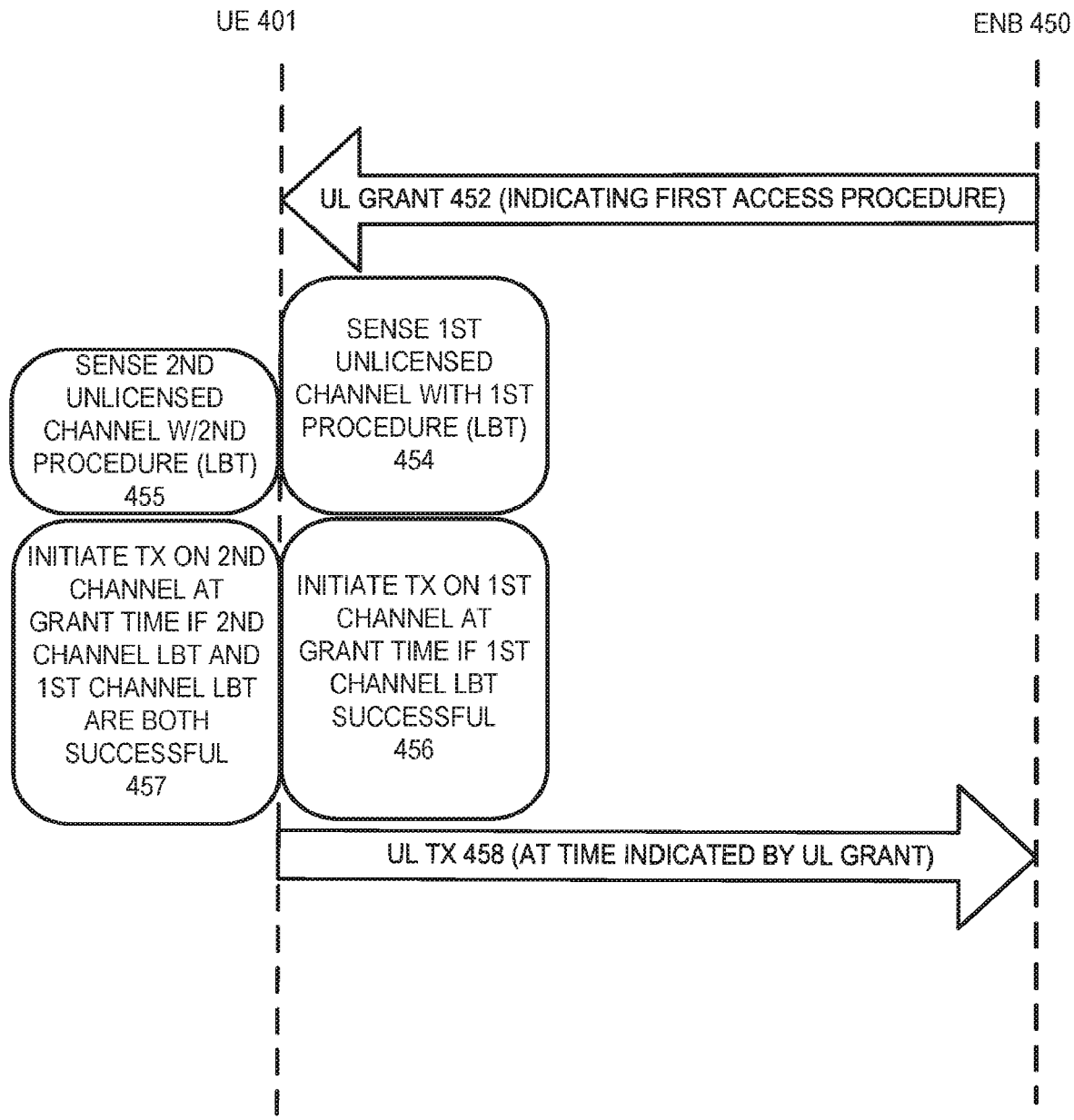
FIG. 4 illustrates aspects of coexistence operations for multi-carrier operation on multiple unlicensed channels, in accordance with some embodiments.

Such operations are further illustrated by FIG. 4. FIG. 4 illustrates aspects of coexistence operations for multi-carrier operation on multiple unlicensed channels, in accordance with some embodiments. FIG. 4 illustrates a communication between a UE 401 and an eNB 450. In operation 452, the eNB 450 sends a UL grant to the UE 401. The UL grant may be sent as part of an RRC communication, a PDSCH transmission, or a PDCCH transmission. The UL grant indicates that the UE 401 should use a first access procedure (e.g. a LBT procedure) in association with the UL grant. Based on system operations, in operation 454, the UE 401 selects one of the multiple unlicensed channels identified in the UL grant, and begins sensing on that selected channel before it begins sensing on the other unlicensed channel(s) identified in the UL grant. At a later time, in operation 455, the UE 401 senses on the other unlicensed channel(s) using a second LBT procedure different from the first LBT procedure that was indicated by the UL grant. In operation 456, the UE 401 initiates transmission on the selected unlicensed channel if the first LBT procedure performed on that channel was successful (e.g., identified that the channel was not in use). In operation 457, the UE 401 initiates transmission on each of the other unlicensed channel(s) identified in the UL grant if both the LBT procedure on the first channel and the LBT procedure on the respective corresponding channel were successful. For example, if U L communications on three unlicensed channels are identified in the UL grant, the first LBT procedure on the channel selected by the UE 401 is successful, the second LBT procedure on one of the two unselected channels is successful, but the second LBT procedure on the other one of the two unselected channels is not successful, then the UE 401 may transmit on both channels where the coexistence procedures were successful while delaying transmission on the one channel where the coexistence procedure was unsuccessful. In operation 458 of FIG. 4, the UE 401 transmits information to the eNB 450 at the time indicated in the UL grant based on the success or failure of the various LBT operations as described above.

While FIG. 4 illustrates one example embodiment, other embodiments with different operations in accordance with any of the LBT operation types described above may be used, with LBT type selection controlled by various combinations of a UE or eNB in different implementations.

Figure 5:
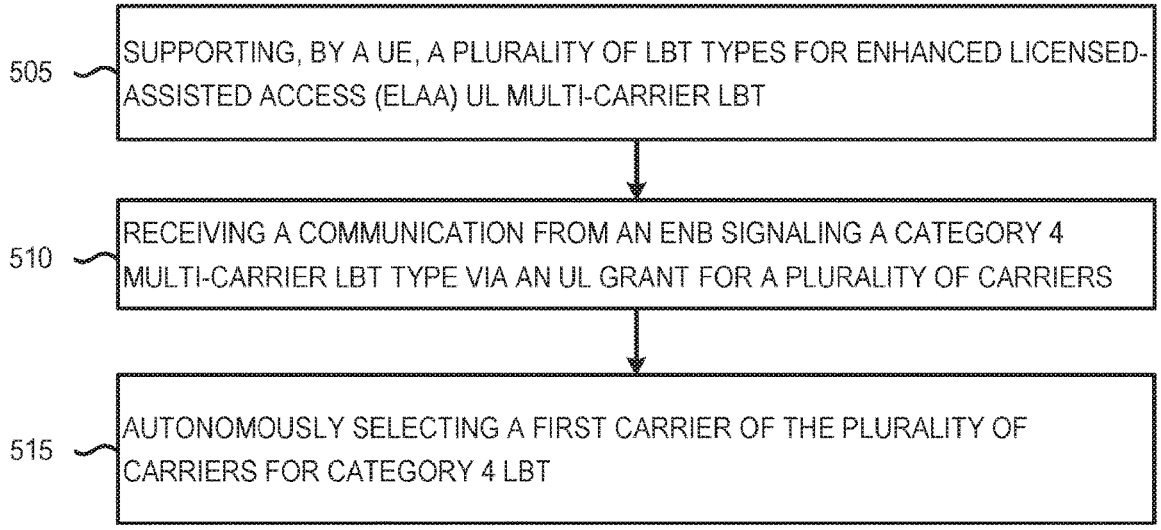
FIG. 5 illustrates one example method for UE operation, in accordance with embodiments described herein.

FIG. 5 illustrates one example method 500 for UE operation, in accordance with embodiments described herein. The method 500 may be implemented by an apparatus of a UE, or by various circuitry of a UE. In some embodiments, the method 500 is embodied by a computer-readable storage medium comprising instructions that, when executed by processing circuitry, cause an eNB to perform the operations of the method 500.

The method 500 includes operation 505, in which a UE supports or is configured for a plurality of LBT types for ELAA UL multi-carrier LBT. The support for a plurality of LBT types enables different LBT operations to be used for different unlicensed channels at the same time. In operation 510, the UE receives a communication from an eNB signaling a category 4 multi-carrier LBT type via a UL grant for a plurality of carriers. The category 4 multi-carrier LBT involves a two-stage clear channel assessment (CCA). In an initial CCA, the channel is sensed for an initial CCA period (e.g., 34 microseconds), and transmits following the initial sensing period if there is no activity on the channel (e.g., power or signals on the channel are below a threshold). If another transmission is needed after this, or if a signal is sensed during the initial CCA period, then an extended CCA is used based on the CW and additional sensing to determine when the channel is clear (e.g., no signal is detected for a given period). The size of the CW may be variable or semi-static within a range of values to manage coexistence with other devices attempting to use the channel. In various embodiments as described above, the CW may be managed based on eNB assessments of the channel, UE feedback reports, static or semi-static system values, or any other such system operation structures. For example, in some embodiments, a channel access procedure comprises an LBT procedure associated with a variable CW updated based on HARQ feedback for all carriers of a plurality of unlicensed carriers associated with one or more UL grants, a certain set of unlicensed frequencies, or a history of channel sensing In the embodiment of the method 500, operation 515 then involves the UE autonomously selecting a first carrier of the plurality of carriers for the category 4 based LBT.

Figure 6:
FIG. 6 illustrates another example method for UE operation, in accordance with embodiments described herein.

FIG. 6 illustrates another example method 600 for UE operation, in accordance with embodiments described herein. The method 600 may be implemented by an apparatus of a UE that supports LAA on multiple unlicensed channels such as baseband circuitry of an integrated circuit, or by various other circuitry of a UE. In some embodiments, the method 600 is embodied by a computer-readable storage medium comprising instructions that, when executed by processing circuitry, cause an eNB to perform the operations of the method 600.

The method 600 includes operation 605 to process one or more UL grants from an eNB scheduling a plurality of PUSCH transmissions on a plurality of unlicensed carriers at a first PUSCH starting position, the one or more UL grants indicating a first channel access procedure for the plurality of PUSCH transmissions. Operation 610 then involves selection of a first unlicensed carrier of the plurality of unlicensed carriers for the first channel access procedure associated with the first PUSCH starting position. This selection may be random or based on various system settings, channel measurements by the UE, other UEs, or the eNB, or any such selection. In some embodiments, the eNB may identify channel access procedure types, and the UE may then randomly select which carriers to use with certain procedure types.

In various embodiments, any number of two or more unlicensed carriers may be used In operation 615, the UE selects at least a second unlicensed carrier of the plurality of unlicensed carriers other than the first unlicensed carrier for a second channel access procedure associated with the first PUSCH starting position. Following results of the channel access procedures (e.g., LBT/CCA), the UE may optionally initiate a first PUSCH transmission on the first unlicensed carrier in operation 620 following successful completion of the first channel access procedure. Similarly, the UE may initiate, in operation 625, an additional PUSCH transmission on each of the remaining unlicensed carriers of the plurality of unlicensed carriers that has succeeded with the second channel access procedure. As mentioned above, failure of the second channel access procedure for an individual carrier does not necessarily impact transmission on the other unlicensed carriers, but failure of the first channel access procedure for the selected unlicensed carrier will impact the transmissions on all other unlicensed carriers of the plurality of unlicensed carriers identified by the one or more UL grants associated with the first PUSCH starting position. For successful second channel access procedures, the UE may initiate an additional PUSCH transmission on each of the remaining successful unlicensed carriers of the plurality of unlicensed carriers that has succeeded with the second channel access procedure immediately before the first PUSCH transmission on the first (selected) unlicensed carrier.

Example Embodiments

In addition to the above example embodiments, any combination of operations or elements described above may be integrated into various embodiments described herein.

Example 1 may include a method of uplink (UL) multi-carrier listen-before-talk (LBT) to be performed by a user equipment (UE).

Example 2 may include a method of example 1 and/or some other example herein, wherein the multi-carrier LBT to be performed by the UE is based on the Release 13 multi-carrier LBT.

Example 3 may include a method of example 2 and/or some other example herein, wherein all or some of the LBT types (A1, A2, B1, B2) are supported for enhanced license-assisted access (ELAA) UL multi-carrier LBT.

Example 4 may include a method of example 1 and/or some other example herein, wherein the multi-carrier LBT type (A1, A2, B1, B2) is signaled by an evolved NodeB (eNB).

Example 5 may include a method of example 4 and/or some other example herein, wherein if all the four types are supported, then the signaling will indicate one out of the four. If only some of the types are supported, e.g., A1 and B2 only, then the signaling will be one out of two. Other combinations are not precluded.

Example 6 may include a method of example 4 and/or some other example herein, wherein the signaling can be via UL grant.

Example 7 may include a method of example 4 and/or some other example herein, wherein the signaling can be via radio resource control (RRC) configuration.

Example 8 may include a method of example 1 and/or some other example herein, wherein the multi-carrier LBT type (A1, A2, B1, B2) is selected by the UE.

Example 9 may include a method of example 1 and/or some other example herein, wherein the contention window size (CWS) is signaled by the eNB, if the CWS is maintained by the eNB.

Example 10 may include a method of example 1 and/or some other example herein, wherein if the UE maintains the CWS, then the CWS is not signaled from the eNB.

Example 11 may include a method of example 1 and/or some other example herein, wherein when type B multi-carrier LBT is used, the eNB can signal the carrier to perform Cat-4 LBT.

Example 12 may include a method of example 1 and/or some other example herein, wherein the UE may autonomously select the carrier to perform Cat-4 LBT by itself.

Example 13 may include an apparatus comprising means to perform one or more elements of a method described in or related to any of examples 1-12, or any other method or process described herein.

Example 14 may include one or more non-transitory computer-readable media comprising instructions to cause an electronic device, upon execution of the instructions by one or more processors of the electronic device, to perform one or more elements of a method described in or related to any of examples 1-12, or any other method or process described herein.

Example 15 may include an apparatus comprising logic, modules, and/or circuitry to perform one or more elements of a method described in or related to any of examples 1-12, or any other method or process described herein.

Example 16 may include a method, technique, or process as described in or related to any of examples 1-12, or portions or parts thereof.

Example 17 may include an apparatus comprising: one or more processors; and one or more computer-readable media comprising instructions that, when executed by the one or more processors, cause the one or more processors to perform methods, techniques, or processes as described in or related to any of examples 1-12, or portions thereof.

Example 18 may include a method of communicating in a wireless network, as shown and described herein.

Example 19 may include a system for providing wireless communication, as shown and described herein.

Example 20 may include a device for providing wireless communication, as shown and described herein.

Example 21 is an apparatus of a user equipment for uplink channel access in license-assisted access (LAA), the apparatus comprising: a memory; and processing circuitry coupled to the memory and configured to: process one or more uplink (UL) grants from an evolved node B (eNB) scheduling a plurality of physical uplink shared channel (PUSCH) transmissions on a plurality of unlicensed carriers at a first PUSCH starting position, the one or more UL grants indicating a first channel access procedure for the plurality of PUSCH transmissions; select a first unlicensed carrier of the plurality of unlicensed carriers for the first channel access procedure associated with the first PUSCH starting position; and select at least a second unlicensed carrier of the plurality of unlicensed carriers other than the first unlicensed carrier for a second channel access procedure associated with the first PUSCH starting position.

In Example 22, the subject matter of Example 21 optionally includes wherein the memory is configured to store one or more channel access indications from the one or more uplink (UL) grants from the eNB scheduling the plurality of PUSCH transmissions on the plurality of unlicensed carriers at the first PUSCH starting position.

In Example 23, the subject matter of any one or more of Examples 21-22 optionally include wherein the first channel access procedure comprises a category-4 listen-before-talk (LBT) procedure.

In Example 24, the subject matter of any one or more of Examples 21-23 optionally include wherein the first channel access procedure comprises a random backoff counter.

In Example 25, the subject matter of any one or more of Examples 21-24 optionally include wherein the second channel access procedure comprises a fixed LBT sensing interval.

In Example 26, the subject matter of Example 25 optionally includes wherein the fixed LBT sensing interval is set to 25 microseconds.

In Example 27, the subject matter of any one or more of Examples 21-26 optionally include wherein the processing circuitry is further configured to initiate a first PUSCH transmission on the first unlicensed carrier following successful completion of the first channel access procedure.

In Example 28, the subject matter of Example 27 optionally includes wherein the processing circuitry is further configured to initiate an additional PUSCH transmission on each of the remaining unlicensed carriers of the plurality of unlicensed carriers that has succeeded with the second channel access procedure immediately before the first PUSCH transmission on the first unlicensed carrier.

In Example 29, the subject matter of any one or more of Examples 22-28 optionally include wherein the processing circuitry is configured to select the first unlicensed carrier randomly from the plurality of unlicensed carriers.

In Example 30, the subject matter of any one or more of Examples 21-29 optionally include wherein the apparatus comprises an integrated circuit, wherein the processing circuitry comprises baseband circuitry disposed in the integrated circuit, and wherein the integrated circuit further comprises the memory.

In Example 31, the subject matter of any one or more of Examples 21-30 optionally include further comprising: one or more antennas coupled to the processing circuitry via radio frequency front-end circuitry, wherein the one or more antennas are configured to transmit the plurality of PUSCH transmissions; application circuitry coupled to the processing circuitry: and a display coupled to the application circuitry.

Example 32 is a computer-readable storage medium comprising instructions for license-assisted access (LAA) uplink communication operations that, when executed by processing circuitry of an apparatus, configure the apparatus to: process one or more uplink (UL) grants from an evolved node B (eNB) scheduling a plurality of physical uplink shared channel (PUSCH) transmissions on a plurality of unlicensed carriers at a first PUSCH starting position, the one or more UL grants indicating a first channel access procedure for the plurality of PUSCH transmissions; autonomously select a first unlicensed carrier of the plurality of unlicensed carriers for the first channel access procedure associated with the first PUSCH starting position: and select remaining unlicensed carriers of the plurality of unlicensed carriers other than the first unlicensed carrier for a second channel access procedure associated with the first PUSCH starting position.

In Example 33, the subject matter of Example 32 optionally includes wherein the first channel access procedure comprises a listen-before-talk (LBT) procedure associated with a variable contention window (CW) updated based on hybrid automatic repeat request (HARQ) feedback for all carriers of the plurality of unlicensed carriers.

In Example 34, the subject matter of any one or more of Examples 32-33 optionally include wherein the first channel access procedure comprises a random backoff counter.

In Example 35, the subject matter of any one or more of Examples 32-34 optionally include wherein the second channel access procedure comprises a fixed LBT sensing interval.

In Example 36, the subject matter of Example 35 optionally includes wherein the fixed LBT sensing interval is set to 25 microseconds.

In Example 37, the subject matter of any one or more of Examples 32-36 optionally include wherein the instructions further configure the apparatus to: initiate a first PUSCH transmission on the first unlicensed carrier following successful completion of the first channel access procedure.

In Example 38, the subject matter of Example 37 optionally includes wherein the instructions further configure the apparatus to: initiate an additional PUSCH transmission on each of the remaining unlicensed carriers of the plurality of unlicensed carriers that has succeeded with the second channel access procedure immediately before the first PUSCH transmission on the first unlicensed carrier.

In Example 39, the subject matter of any one or more of Examples 32-38 optionally include wherein the instructions further configure the apparatus to: select the first unlicensed carrier randomly from the plurality of unlicensed carriers.

In Example 40, the subject matter of any one or more of Examples 21-39 optionally includes an apparatus of a user equipment (UE) configured to operate using a plurality of unlicensed carriers in a license-assisted access (LAA) system, the apparatus comprising: a communication interface configured to receive one or more channel access indications from one or more uplink (UL) grants from an evolved node B (eNB) scheduling a plurality of physical uplink shared channel (PUSCH) transmissions on the plurality of unlicensed carriers at a first PUSCH starting position, and processing circuitry coupled to the communication interface and configured to: process the one or more UL grants to identify the first PUSCH starting position for the plurality of PUSCH transmissions on the plurality of unlicensed carriers; process the one or more UL grants to identify a Type 1 channel access procedure for the plurality of PUSCH transmissions on the plurality of unlicensed carriers; select a first carrier of the plurality of unlicensed carriers; initiate the Type 1 channel access procedure on the first carrier in response to selection of the first carrier: initiate a first PUSCH transmission of the plurality of PUSCH transmissions on the first carrier of the plurality of unlicensed carriers in response to the Type 1 channel access procedure; and initiate Type 2 channel access procedures on one or more second carriers of the plurality of unlicensed carriers, wherein the one or more second carriers do not include the first carrier, and wherein the Type 2 channel access procedures are performed immediately before the first PUSCH transmission on the first carrier.

In Example 41, the subject matter of Example 40 optionally includes wherein the Type 1 channel access procedure comprises a listen-before-talk (LBT) procedure associated with a variable contention window (CW) calculated independently for each carrier of the plurality of unlicensed carriers and a backup counter based on a largest CW of the variable CWs calculated for each carrier of the plurality of unlicensed carriers.

In Example 42, the subject matter of any one or more of Examples 40-41 optionally include wherein the Type 1 channel access procedure comprises a random backoff counter.

In Example 43, the subject matter of any one or more of Examples 40-42 optionally include wherein the Type 2 channel access procedure comprises a fixed LBT sensing interval.

In Example 44, the subject matter of Example 43 optionally includes wherein the fixed LBT sensing interval is set to 25 microseconds.

In Example 45, the subject matter of any one or more of Examples 40-44 optionally include further comprising a memory coupled to the processing circuitry and configured to store the one or more channel access indications; and wherein the processing circuitry of the UE is configured to select the first carrier randomly from the plurality of unlicensed carriers.

Example 46 is an apparatus of a user equipment for uplink channel access in license-assisted access (LAA), the apparatus comprising: means for processing one or more uplink (UL) grants from an evolved node B (eNB) scheduling a plurality of physical uplink shared channel (PUSCH) transmissions on a plurality of unlicensed carriers at a first PUSCH starting position, the one or more UL grants indicating a first channel access procedure for the plurality of PUSCH transmissions; means for selecting a first unlicensed carrier of the plurality of unlicensed carriers for the first channel access procedure associated with the first PUSCH starting position; and means for selecting at least a second unlicensed carrier of the plurality of unlicensed carriers other than the first unlicensed carrier for a second channel access procedure associated with the first PUSCH starting position.

In Example 47, the subject matter of Example 46 optionally includes wherein the memory is configured to store one or more channel access indications from the one or more uplink (UL) grants from the eNB scheduling the plurality of PUSCH transmissions on the plurality of unlicensed carriers at the first PUSCH starting position.

In Example 48, the subject matter of any one or more of Examples 46-47 optionally include wherein the first channel access procedure comprises a category-4 listen-before-talk (LBT) procedure.

In Example 49, the subject matter of any one or more of Examples 46-48 optionally include wherein the first channel access procedure comprises a random backoff counter.

In Example 50, the subject matter of any one or more of Examples 46-49 optionally include wherein the second channel access procedure comprises a fixed LBT sensing interval.

In Example 51, the subject matter of Example 50 optionally includes wherein the fixed LBT sensing interval is set to 25 microseconds.

In Example 52, the subject matter of any one or more of Examples 46-51 optionally include wherein the processing circuitry is further configured to initiate a first PUSCH transmission on the first unlicensed carrier following successful completion of the first channel access procedure.

In Example 53, the subject matter of Example 52 optionally includes wherein the processing circuitry is further configured to initiate an additional PUSCH transmission on each of the remaining unlicensed carriers of the plurality of unlicensed carriers that has succeeded with the second channel access procedure immediately before the first PUSCH transmission on the first unlicensed carrier.

In Example 54, the subject matter of any one or more of Examples 47-53 optionally include wherein the processing circuitry is configured to select the first unlicensed carrier randomly from the plurality of unlicensed carriers.

In Example 55, the subject matter of any one or more of Examples 46-54 optionally include wherein the apparatus comprises an integrated circuit, wherein the processing circuitry comprises baseband circuitry disposed in the integrated circuit, and wherein the integrated circuit further comprises the memory.

In Example 56, the subject matter of any one or more of Examples 46-55 optionally include further comprising: means for transmitting the plurality of PUSCH transmissions; means for processing application data; and means for displaying visual output data.

Example 57 is a method for license-assisted access (LAA) uplink communication operations comprising: processing one or more uplink (UL) grants from an evolved node B (eNB) scheduling a plurality of physical uplink shared channel (PUSCH) transmissions on a plurality of unlicensed carriers at a first PUSCH starting position, the one or more UL grants indicating a first channel access procedure for the plurality of PUSCH transmissions; autonomously selecting a first unlicensed carrier of the plurality of unlicensed carriers for the first channel access procedure associated with the first PUSCH starting position; and selecting remaining unlicensed carriers of the plurality of unlicensed carriers other than the first unlicensed carrier for a second channel access procedure associated with the first PUSCH starting position.

In Example 58, the subject matter of Example 57 optionally includes wherein the first channel access procedure comprises a listen-before-talk (LBT) procedure associated with a variable contention window (CW) updated based on hybrid automatic repeat request (HARQ) feedback for all carriers of the plurality of unlicensed carriers.

In Example 59, the subject matter of any one or more of Examples 57-58 optionally include wherein the first channel access procedure comprises a random backoff counter.

In Example 60, the subject matter of any one or more of Examples 57-59 optionally include wherein the second channel access procedure comprises a fixed LBT sensing interval.

In Example 61, the subject matter of Example 60 optionally includes wherein the fixed LBT sensing interval is set to 25 microseconds.

In Example 62, the subject matter of any one or more of Examples 57-61 optionally include further comprising initiating a first PUSCH transmission on the first unlicensed carrier following successful completion of the first channel access procedure.

In Example 63, the subject matter of Example 62 optionally includes further comprising initiating an additional PUSCH transmission on each of the remaining unlicensed carriers of the plurality of unlicensed carriers that has succeeded with the second channel access procedure immediately before the first PUSCH transmission on the first unlicensed carrier.

In Example 64, the subject matter of any one or more of Examples 57-63 optionally include wherein the instructions further configure the apparatus to: selecting the first unlicensed carrier randomly from the plurality of unlicensed carriers.

In Example 65, the subject matter of any one or more of Examples 21-64 optionally include an apparatus of a user equipment (UE) configured to operate using a plurality of unlicensed carriers in a license-assisted access (LAA) system, the apparatus comprising: means for receiving one or more channel access indications from one or more uplink (UL) grants from an evolved node B (eNB) scheduling a plurality of physical uplink shared channel (PUSCH) transmissions on the plurality of unlicensed carriers at a first PUSCH starting position; means for processing the one or more UL grants to identify the first PUSCH starting position for the plurality of PUSCH transmissions on the plurality of unlicensed carriers; means for processing the one or more UL grants to identify a Type 1 channel access procedure for the plurality of PUSCH transmissions on the plurality of unlicensed carriers; means for selecting a first carrier of the plurality of unlicensed carriers; means for initiating the Type 1 channel access procedure on the first carrier in response to selection of the first carrier; means for initiating a first PUSCH transmission of the plurality of PUSCH transmissions on the first carrier of the plurality of unlicensed carriers in response to the Type 1 channel access procedure; and means for initiating Type 2 channel access procedures on one or more second carriers of the plurality of unlicensed carriers, wherein the one or more second carriers do not include the first carrier, and wherein the Type 2 channel access procedures are performed immediately before the first PUSCH transmission on the first carrier.

In Example 66, the subject matter of Example 65 optionally includes wherein the Type 1 channel access procedure comprises a listen-before-talk (LBT) procedure associated with a variable contention window (CW) calculated independently for each carrier of the plurality of unlicensed carriers and a backup counter based on a largest CW of the variable CWs calculated for each carrier of the plurality of unlicensed carriers.

In Example 67, the subject matter of any one or more of Examples 65-66 optionally include wherein the Type 1 channel access procedure comprises a random backoff counter.

In Example 68, the subject matter of any one or more of Examples 65-67 optionally include wherein the Type 2 channel access procedure comprises a fixed LBT sensing interval.

In Example 69, the subject matter of Example 68 optionally includes wherein the fixed LBT sensing interval is set to 25 microseconds.

In Example 70, the subject matter of any one or more of Examples 65-69 optionally include further comprising means for storing the one or more channel access indications; and means for selecting the first carrier randomly from the plurality of unlicensed carriers.

Example 71 is a computer readable storage medium comprising instructions that, when executed by one or more processors of a device, cause the device to perform the operations of any method described above.

Additionally, other example embodiments may include any examples described above with the individual operations or device elements repeated or ordered with intervening elements or operations in any functional order.

Figure 7:
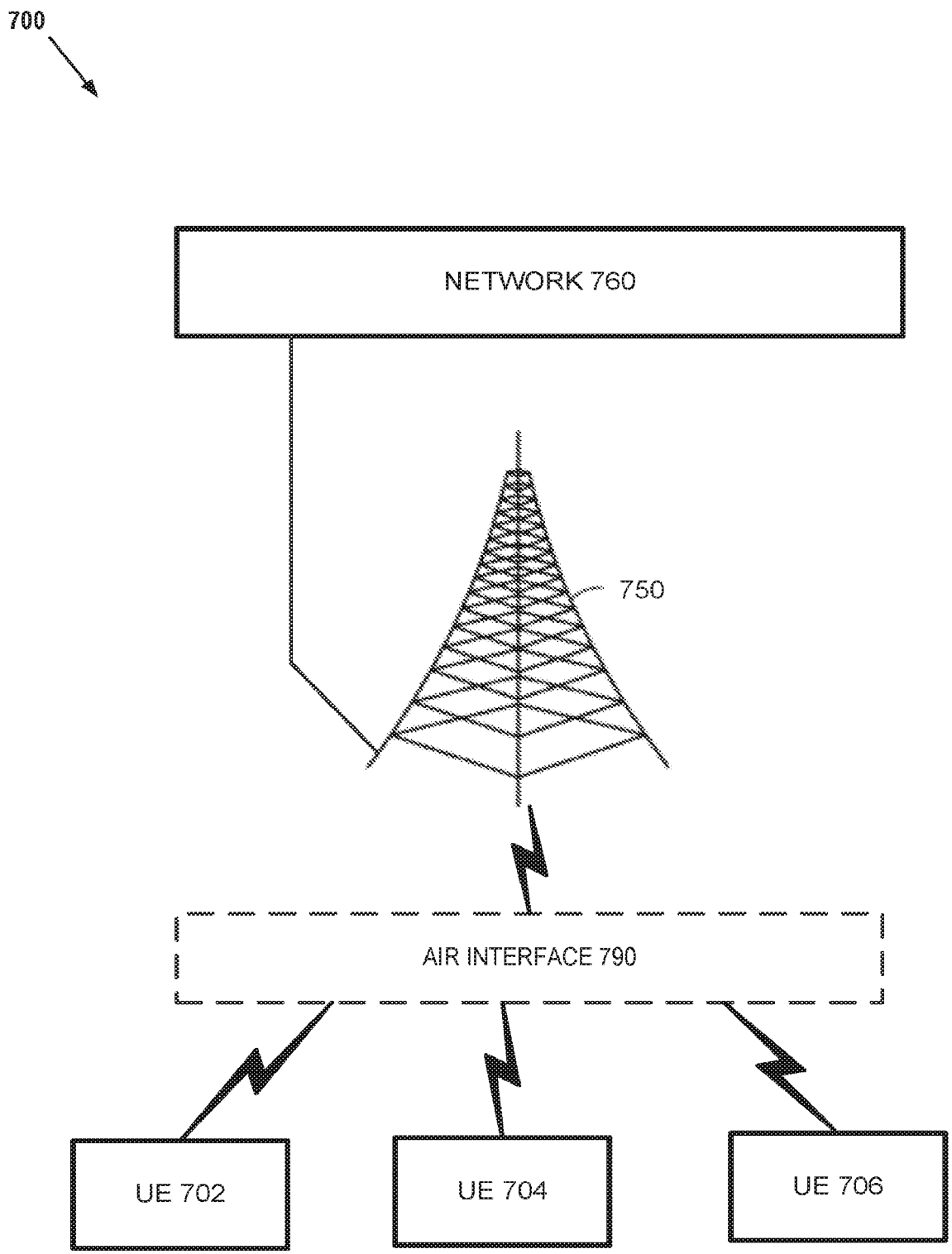
FIG. 7 is a block diagram of a system, including an eNB and multiple UEs, that may be used with some embodiments described herein.

FIG. 7 is a block diagram of a system 700 including an eNB 750 and multiple UEs 702, 704, and 706 that may be used with some embodiments described herein. FIG. 7 shows the eNB 750 coupled to the UEs 702, 704, and 706 via an air interface 790. The eNB 750 provides the UEs 702-706 with access to a network 760, which may be a wide area network or the Internet. Any of these elements may be similar to corresponding elements described above. In various embodiments, in order to access an unlicensed channel, the UEs 702, 704, and 706 perform coexistence operations, and use the subframes allocated by the eNB 750 to upload data including bundled HARQ messages to the eNB 750. In some embodiments, the eNB 750 comprises a single device. In other embodiments, the eNB 750 or any other eNB described herein may be implemented in a cloud radio area network (C-RAN) structure, with one or more baseband processors in a first component device of the eNB and one or more antennas in one or more other devices coupled to the first component device. For example, in some such embodiments, a first component device having baseband processors is coupled to one or more second component devices each having one or more antennas, and each being connected to the first component device via a fiber-optic connection or some other wired or wireless connection.

Figure 8:
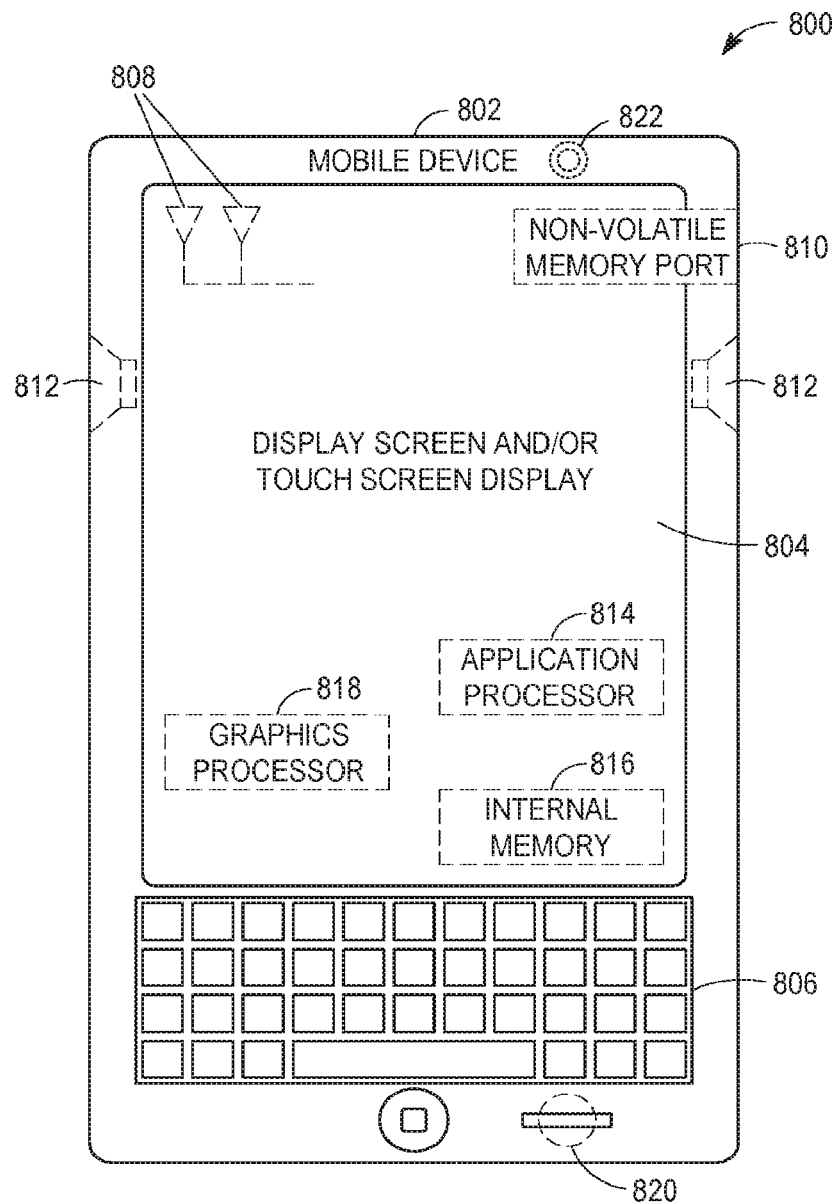
FIG. 8 illustrates aspects of a UE, in accordance with some example embodiments.

FIG. 8 shows an example UE 800. The UE 800 may be an implementation of the UE 102, or any device described herein. The UE 800 can include one or more antennas 808 configured to communicate with a transmission station, such as a base station (BS), an eNB, or another type of wireless wide area network (WWAN) access point. The UE 800 can be configured to communicate using at least one wireless communication standard including 3GPP LTE, WiMAX®, High-Speed Packet Access (HSPA), Bluetooth, and Wi-Fi®. The UE 800 can communicate using separate antennas for each wireless communication standard or shared antennas for multiple wireless communication standards. The UE 800 can communicate in a WLAN, a wireless personal area network (WPAN), and/or a WWAN.

FIG. 8 also shows a microphone 820 and one or more speakers 812 that can be used for audio input and output to and from the UE 800. A display screen 804 can be a liquid crystal display (LCD) screen, or another type of display screen such as an organic light-emitting diode (OLED) display. The display screen 804 can be configured as a touch screen. The touch screen can use capacitive, resistive, or another type of touch-screen technology. An application processor 814 and a graphics processor 818 can be coupled to an internal memory 816 to provide processing and display capabilities. A non-volatile memory port 810 can also be used to provide data I/O options to a user. The non-volatile memory port 810 can also be used to expand the memory capabilities of the UE 800. A keyboard 806 can be integrated with the UE 800 or wirelessly connected to the UE 800 to provide additional user input. A virtual keyboard can also be provided using the touch screen. A camera 822 located on the front (display screen) side or the rear side of the UE 800 can also be integrated into a housing 802 of the UE 800.

Figure 9:
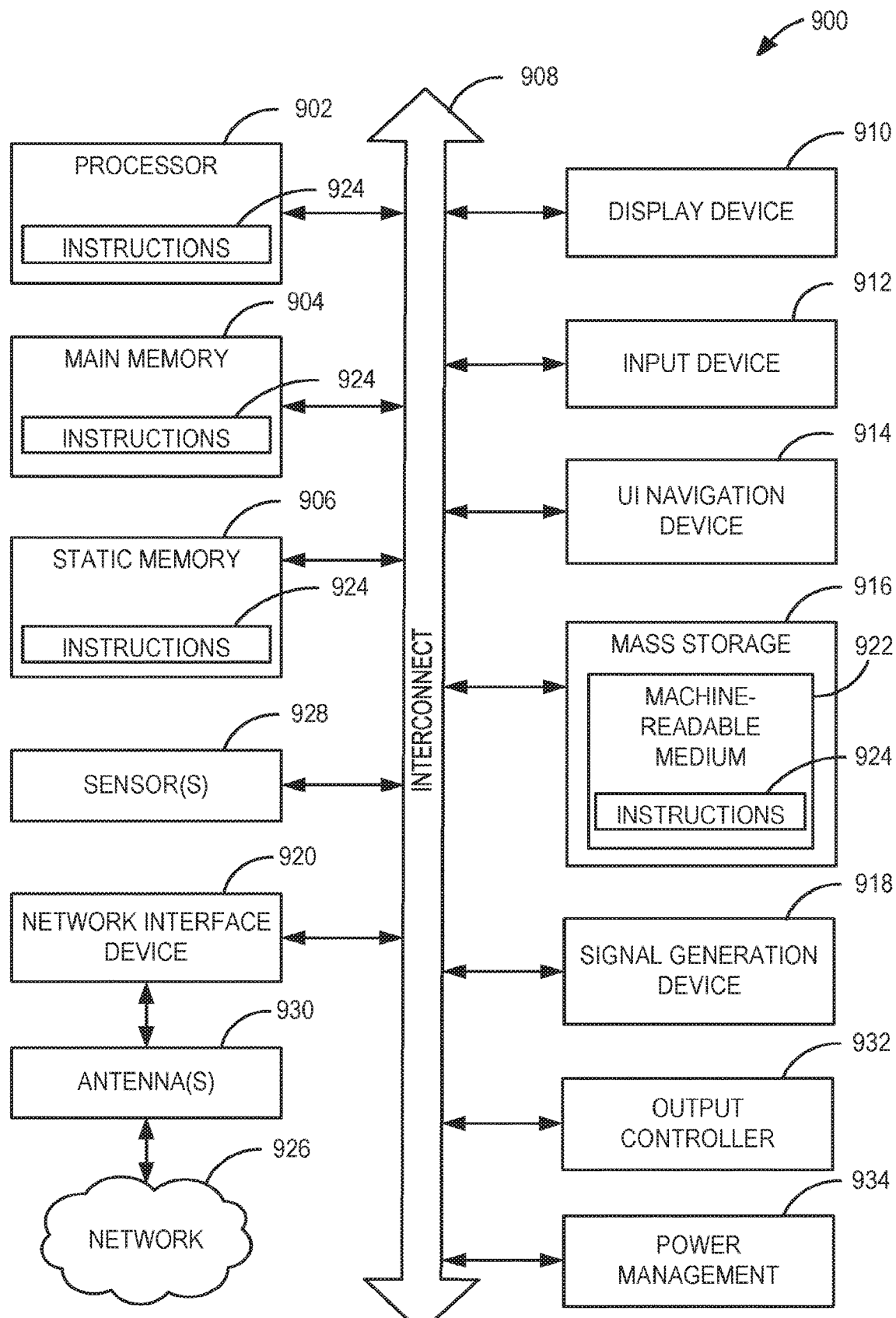
FIG. 9 is a block diagram illustrating an example computer system machine which may be used in association with various embodiments described herein.

FIG. 9 is a block diagram illustrating an example computer system machine 900 upon which any one or more of the methodologies herein discussed can be run, and which may be used to implement the eNB 104, the UE 102, or any other device described herein. In various alternative embodiments, the computer system machine 900 operates as a standalone device or can be connected (e.g., networked) to other machines. In a networked deployment, the computer system machine 900 can operate in the capacity of either a server or a client machine in server-client network environments, or it can act as a peer machine in peer-to-peer (or distributed) network environments. The computer system machine 900 can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, a network switch, a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system machine 900 includes a processor 902 (e.g., a central processing unit (CPU), a graphics processing unit (GPU), or both), a main memory 904, and a static memory 906, which communicate with each other via an interconnect 908 (e.g., a link, a bus, etc.). The computer system machine 900 can further include a video display device 910, an alphanumeric input device 912 (e.g., a keyboard), and a user interface (UI) navigation device 914 (e.g., a mouse). In one embodiment, the video display device 910, alphanumeric input device 912, and UI navigation device 914 are a touch screen display. The computer system machine 900 can additionally include a mass storage device 916 (e.g., a drive unit), a signal generation device 918 (e.g., a speaker), an output controller 932, a power management controller 934, a network interface device 920 (which can include or operably communicate with one or more antennas 930, transceivers, or other wireless communications hardware), and one or more sensors 928, such as a GPS sensor, compass, location sensor, accelerometer, or other sensor.

The mass storage device 916 includes a machine-readable medium 922 on which is stored one or more sets of data structures and instructions 924 (e.g., software) embodying or utilized by any one or more of the methodologies or functions described herein. The instructions 924 can also reside, completely or at least partially, within the main memory 904, static memory 906, and/or processor 902 during execution thereof by the computer system machine 900, with the main memory 904, the static memory 906, and the processor 902 also constituting machine-readable media.

While the machine-readable medium 922 is illustrated in an example embodiment to be a single medium, the term "machine-readable medium" can include a single medium or multiple media (e.g., a centralized or distributed database, and/or associated caches and servers) that store the one or more instructions 924. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions.

The instructions 924 can further be transmitted or received over a communications network 926 using a transmission medium via the network interface device 920 utilizing any one of a number of well-known transfer protocols (e.g., hypertext transfer protocol (HTTP)) The term "transmission medium" shall be taken to include any medium that is capable of storing, encoding, or carrying instructions for execution by the machine, and includes digital or analog communications signals or other intangible media to facilitate communication of such software.

Various techniques, or certain aspects or portions thereof, may take the form of program code (i.e., instructions) embodied in tangible media, such as floppy diskettes. CD-ROMs, hard drives, non-transitory computer-readable storage media, or any other machine-readable storage medium wherein, when the program code is loaded into and executed by a machine, such as a computer, the machine becomes an apparatus for practicing the various techniques. In the case of program code execution on programmable computers, the computer may include a processor, a storage medium readable by the processor (including volatile and non-volatile memory and/or storage elements), at least one input device, and at least one output device. The volatile and non-volatile memory and/or storage elements may be a Random Access Memory (RAM), Erasable Programmable Read-Only Memory (EPROM), flash drive, optical drive, magnetic hard drive, or other medium for storing electronic data. The eNB and UE may also include a transceiver module, a counter module, a processing module, and/or a clock module or timer module. One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, IEEE 802.11, and Bluetooth communication standards. Various alternative embodiments may use a variety of other WWAN, WLAN, and WPAN protocols and standards in connection with the techniques described herein. These standards include, but are not limited to, other standards from 3GPP (e.g., HSPA+, UMTS), IEEE 902.16 (e.g., 902.16p), or Bluetooth (e.g., Bluetooth 7.0, or like standards defined by the Bluetooth Special Interest Group) standards families. Other applicable network configurations can be included within the scope of the presently described communication networks. It will be understood that communications on such communication networks can be facilitated using any number of personal area networks (PANs), local area networks (LANs), and wide area networks (WANs), using any combination of wired or wireless transmission mediums.

Figure 10:
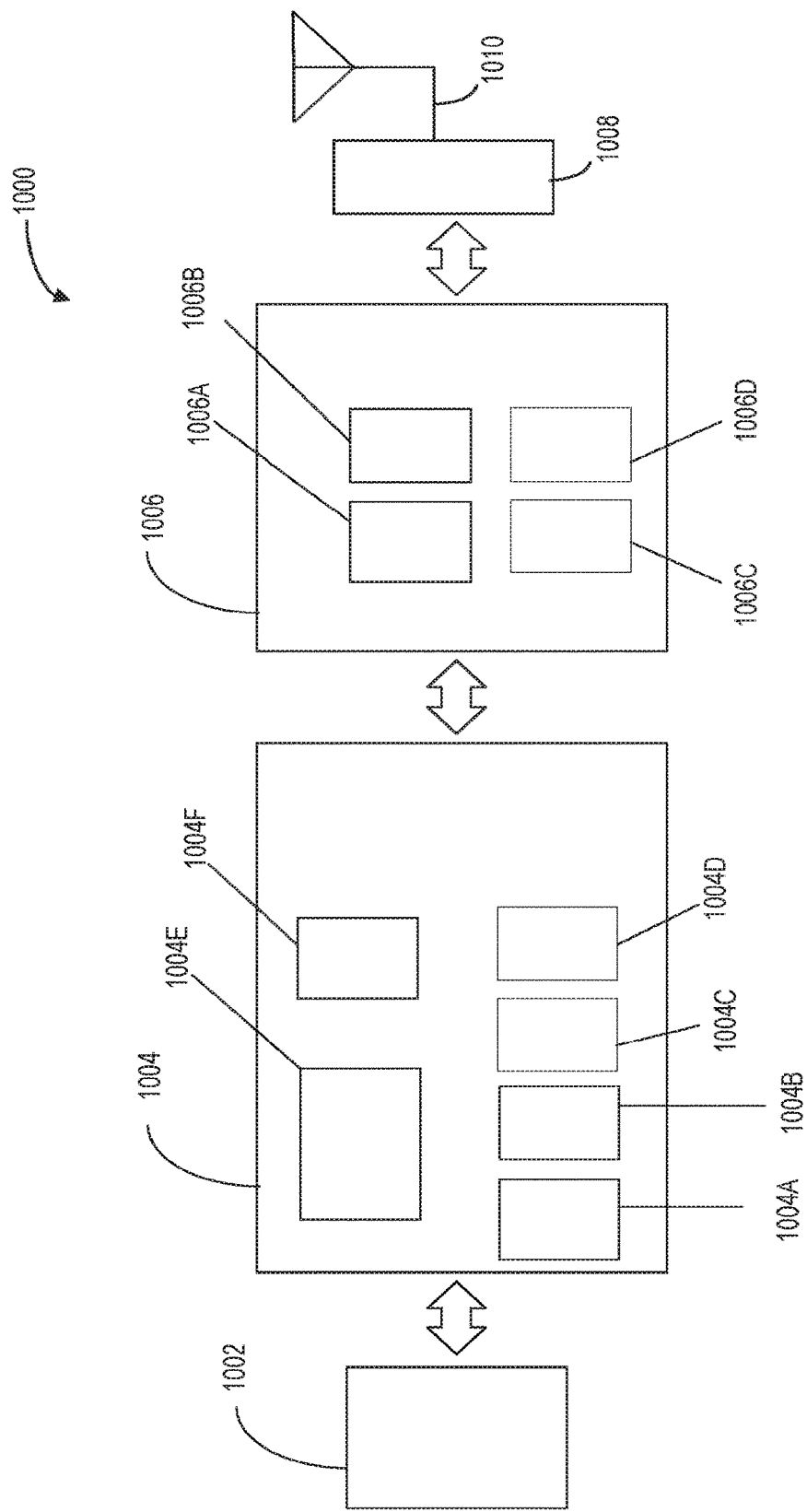
FIG. 10 illustrates aspects of a UE, a wireless apparatus, or a device, in accordance with some example embodiments.

Embodiments described herein may be implemented into a system using any suitably configured hardware and/or software. FIG. 10 illustrates components of a UE 1000 in accordance with some embodiments. At least some of the components shown may be used in the UE 102 (or eNB 104) shown in FIG. 1. The UE 1000 and other components may be configured to use the synchronization signals as described herein. The U E 1000 may be one of the UEs 102 shown in FIG. 1 and may be a stationary, non-mobile device or may be a mobile device. In some embodiments, the UE 1000 may include application circuitry 1002, baseband circuitry 1004, Radio Frequency (RF) circuitry 1006, front-end module (FEM) circuitry 1008, and one or more antennas 1010, coupled together at least as shown. At least some of the baseband circuitry 1004, RF circuitry 1006, and FEM circuitry 1008 may form a transceiver. In some embodiments, other network elements, such as the eNB 104, may contain some or all of the components shown in FIG. 10. Other of the network elements, such as the MME 122, may contain an interface, such as the S1 interface, to communicate with the eNB 104 over a wired connection regarding the UE 1000.

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the UE 1000.

The baseband circuitry 1004 may include circuitry such as, but not limited to, one or more single-core or multi-core processors. The baseband circuitry 1004 may include one or more baseband processors and/or control logic to process baseband signals received from a receive signal path of the RF circuitry 1006 and to generate baseband signals for a transmit signal path of the RF circuitry 1006. The baseband circuitry 1004 may interface with the application circuitry 1002 for generation and processing of the baseband signals and for controlling operations of the RF circuitry 1006. For example, in some embodiments, the baseband circuitry 1004 may include a second generation (2G) baseband processor 1004a, third generation (3G) baseband processor 1004b, fourth generation (4G) baseband processor 1004c, and/or other baseband processor(s) 1004d for other existing generations, generations in development, or generations to be developed in the future (e.g., fifth generation (5G), etc.). The baseband circuitry 1004 (e.g., one or more of the baseband processors 1004a-d) may handle various radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1004 may include FFT, precoding, and/or constellation mapping/demapping functionality. In some embodiments, encoding/decoding circuitry of the baseband circuitry 1004 may include convolution, tail-biting convolution, turbo, Viterbi, and/or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004e of the baseband circuitry 1004 may be configured to run elements of the protocol stack for signaling of the PHY, MAC, RLC, PDCP, and/or RRC layers. In some embodiments, the baseband circuitry 1004 may include one or more audio digital signal processor(s) (DSPs) 1004f. The audio DSP(s) 1004f may be or include elements for compression/decompression and echo cancellation and may include other suitable processing elements in other embodiments. Components of the baseband circuitry 1004 may be suitably combined in a single chip or a single chipset, or disposed on a same circuit board in some embodiments. In some embodiments, some or all of the constituent components of the baseband circuitry 1004 and the application circuitry 1002 may be implemented together, such as, for example, on a system on a chip (SOC).

In some embodiments, the baseband circuitry 1004 may provide for communication compatible with one or more radio technologies. For example, in some embodiments, the baseband circuitry 1004 may support communication with an EUTRAN and/or other wireless metropolitan area networks (WMAN), a WLAN, or a WPAN. Embodiments in which the baseband circuitry 1004 is configured to support radio communications of more than one wireless protocol may be referred to as multi-mode baseband circuitry. In some embodiments, the UE 1000 can be configured to operate in accordance with communication standards or other protocols or standards, including IEEE 802.16 wireless technology (WiMax®), IEEE 802.11 wireless technology (Wi-Fi®) including IEEE 802.11ad, which operates in the 70 GHz millimeter wave spectrum, or various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

The RF circuitry 1006 may enable communication with wireless networks using modulated electromagnetic radiation through a non-solid medium. In various embodiments, the RF circuitry 1006 may include switches, filters, amplifiers, etc., to facilitate the communication with the wireless network. The RF circuitry 1006 may include a receive signal path which may include circuitry to down-convert RF signals received from the FEM circuitry 1008 and provide baseband signals to the baseband circuitry 1004. The RF circuitry 1006 may also include a transmit signal path which may include circuitry to up-convert baseband signals provided by the baseband circuitry 1004 and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006a, amplifier circuitry 1006b, and filter circuitry 1006c. The transmit signal path of the RF circuitry 1006 may include the filter circuitry 1006c and the mixer circuitry 1006a. The RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by the synthesizer circuitry 1006d. The amplifier circuitry 1006b may be configured to amplify the down-converted signals, and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, the mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by the filter circuitry 1006c. The filter circuitry 1006c may include a low-pass filter (LPF), although the scope of the embodiments is not limited in this respect.

In some embodiments, the mixer circuitry 1006a of the receive signal path and the mixer circuitry 1006a of the transmit signal path may include two or more mixers and may be arranged for quadrature downconversion and/or upconversion respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a of the transmit signal path may be arranged for direct downconversion and/or direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio integrated circuit (IC) circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect, as other types of frequency synthesizers may be suitable. For example, the synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the application circuitry 1002 depending on the desired output frequency. In some embodiments, a divider control input (e.g., N) may be determined from a look-up table based on a channel indicated by the application circuitry 1002.

The synthesizer circuitry 1006d of the RF circuitry 1006 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1006 may include an IQ/polar converter.

The FEM circuitry 1008 may include a receive signal path, which may include circuitry configured to operate on RF signals received from the one or more antennas 1010, amplify the received signals, and provide the amplified versions of the received signals to the RF circuitry 1006 for further processing. The FEM circuitry 1008 may also include a transmit signal path, which may include circuitry configured to amplify signals for transmission provided by the RF circuitry 1006 for transmission by one or more of the one or more antennas 1010.

In some embodiments, the FEM circuitry 1008 may include a Tx/Rx switch to switch between transmit mode and receive mode operation. The FEM circuitry 1008 may include a receive signal path and a transmit signal path. The receive signal path of the FEM circuitry 1008 may include a low-noise amplifier (LNA) to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by the RF circuitry 1006), and one or more filters to generate RF signals for subsequent transmission (e.g., by one or more of the one or more antennas 1010).

In some embodiments, the UE 1000 may include additional elements such as, for example, a memory/storage, display, camera, sensor, and/or input/output (I/O) interface as described in more detail below. In some embodiments, the UE 1000 described herein may be part of a portable wireless communication device, such as a PDA, a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly. In some embodiments, the UE 1000 may include one or more user interfaces designed to enable user interaction with the system and/or peripheral component interfaces designed to enable peripheral component interaction with the system. For example, the UE 1000 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or light-emitting diode (LED) screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 1010 may comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the antennas 1010 may be effectively separated to benefit from spatial diversity and the different channel characteristics that may result.

Although the UE 1000 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, field-programmable gate arrays (FPGAs), application-specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

While the communication device-readable medium is illustrated as a single medium, the term "communication device-readable medium" may include a single medium or multiple media (e.g., a centralized or distributed database, and/or associated caches and servers) configured to store the one or more instructions.

The term "communication device-readable medium" may include any medium that is capable of storing, encoding, or carrying instructions for execution by the communication device and that cause the communication device to perform any one or more of the techniques of the present disclosure, or that is capable of storing, encoding, or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., EPROM, Electrically Erasable Programmable Read-Only Memory (EEPROM)) and flash memory devices; magnetic disks, such as internal hard disks and removable disks; magneto-optical disks; RAM; and CD-ROM and DVD-ROM disks. In some examples, communication device-readable media may include non-transitory communication device-readable media. In some examples, communication device-readable media may include communication device-readable media that is not a transitory propagating signal.

The instructions may further be transmitted or received over a communications network using a transmission medium via a network interface device utilizing any one of a number of transfer protocols (e.g., frame relay, internet protocol (IP), transmission control protocol (TCP), user datagram protocol (UDP), HTTP, etc.). Example communication networks may include a LAN, a WAN, a packet data network (e.g., the Internet), mobile telephone networks (e.g., cellular networks), Plain Old Telephone Service (POTS) networks, wireless data networks (e.g., IEEE 802.11 family of standards known as Wi-Fi®, IEEE 802.16 family of standards known as WiMAX®), IEEE 802.15.4 family of standards, an LTE family of standards, a Universal Mobile Telecommunications System (UMTS) family of standards, or peer-to-peer (P2P) networks, among others. In an example, the network interface device may include one or more physical jacks (e.g., Ethernet, coaxial, or phone jacks) or one or more antennas to connect to the communications network. In an example, the network interface device may include a plurality of antennas to wirelessly communicate using single-input multiple-output (SIMO), MIMO, or multiple-input single-output (MISO) techniques. In some examples, the network interface device may wirelessly communicate using Multiple User MIMO techniques. The term "transmission medium" shall be taken to include any intangible medium that is capable of storing, encoding, or carrying instructions for execution by the communication device, and includes digital or analog communications signals or other intangible media to facilitate communication of such software.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), RAM, magnetic disk storage media, optical storage media, flash-memory devices, and other storage devices and media. Some embodiments may include one or more processors and may be configured with instructions stored on a computer-readable storage device.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form apart hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the subject matter may be referred to herein, individually and/or collectively, by the term "embodiments" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system, UE, article, composition, formulation, or process that includes elements in addition to those listed after such a term in a claim is still deemed to fall within the scope of that claim. Moreover, in the following claims, the terms "first," "second," "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a processor configured to cause a user equipment (UE) to:
receive one or more channel access indications from one or more uplink (UL) grants from a base station scheduling a plurality of physical uplink shared channel (PUSCH) transmissions on a plurality of unlicensed carriers at a first PUSCH starting position;
process the one or more UL grants to identify the first PUSCH starting position for the plurality of PUSCH transmissions on the plurality of unlicensed carriers;
process the one or more UL grants to identify a Type 1 channel access procedure for the plurality of PUSCH transmissions on the plurality of unlicensed carriers;
select a first carrier of the plurality of unlicensed carriers;
initiate the Type 1 channel access procedure on the first carrier in response to selection of the first carrier;
determine that the Type 1 channel access procedure is successful;
initiate a first PUSCH transmission of the plurality of PUSCH transmissions on the first carrier of the plurality of unlicensed carriers in response to the determination that the Type 1 channel access procedure is successful;
initiate a Type 2 channel access procedure on one or more second carriers of the plurality of unlicensed carriers, wherein the one or more second carriers do not include the first carrier, and wherein the Type 2 channel access procedure are performed immediately before the first PUSCH transmission on the first carrier;
determine whether the Type 2 channel access procedure is successful; and
based on the determination whether the Type 2 channel access procedure is successful:
if both the Type 1 channel access procedure and the Type 2 channel access procedure are successful, initiate a second PUSCH transmission of the plurality of PUSCH transmissions on the one or more second carriers; or
if the Type 2 channel access procedure is not successful, delay transmission on at least a third carrier of the one or more second carriers.

2. The apparatus of claim 1, wherein the Type 1 channel access procedure comprises a listen-before-talk (LBT) procedure associated with a variable contention window (CW) calculated independently for respective carriers of the plurality of unlicensed carriers and a backup counter based on a largest CW of respective variable CWs calculated for respective carriers of the plurality of unlicensed carriers.

3. The apparatus of claim 1, wherein the Type 1 channel access procedure comprises a random backoff counter.

4. The apparatus of claim 1, wherein the Type 2 channel access procedure comprises a fixed LBT sensing interval.

5. The apparatus of claim 4, wherein the fixed LBT sensing interval is set to 25 microseconds.

6. The apparatus of claim 1, wherein the processor is further configured to cause the UE to select the first carrier randomly from the plurality of unlicensed carriers.

7. The apparatus of claim 1, wherein the Type 1 channel access procedure comprises a category-4 listen-before-talk (LBT) procedure.

8. The apparatus of claim 1, wherein both the first PUSCH transmission and the second PUSCH transmission begin at the first PUSCH starting position.

9. The apparatus of claim 8, wherein the processor is further configured to cause the UE to:
determine that the Type 2 channel access procedure is successful on a fourth carrier of the one or more second carriers; and
in response to the determination that the Type 2 channel access procedure is successful on the fourth carrier, initiate a third PUSCH transmission of the plurality of PUSCH transmissions at the first PUSCH starting position.

10. A user equipment (UE), comprising:
a radio; and
a processor operably coupled to the radio and configured to cause the UE to:
receive one or more channel access indications from one or more uplink (UL) grants from a base station scheduling a plurality of physical uplink shared channel (PUSCH) transmissions on a plurality of unlicensed carriers at a first PUSCH starting position;
process the one or more UL grants to identify the first PUSCH starting position for the plurality of PUSCH transmissions on the plurality of unlicensed carriers;
process the one or more UL grants to identify a Type 1 channel access procedure for the plurality of PUSCH transmissions on the plurality of unlicensed carriers;
select a first carrier of the plurality of unlicensed carriers;
initiate the Type 1 channel access procedure on the first carrier in response to selection of the first carrier;
determine that the Type 1 channel access procedure is successful;
initiate a first PUSCH transmission of the plurality of PUSCH transmissions on the first carrier of the plurality of unlicensed carriers in response to the determination that the Type 1 channel access procedure is successful;
initiate a Type 2 channel access procedure on one or more second carriers of the plurality of unlicensed carriers, wherein the one or more second carriers do not include the first carrier, and wherein the Type 2 channel access procedure are performed immediately before the first PUSCH transmission on the first carrier;
determine whether the Type 2 channel access procedure is successful; and
based on the determination whether the Type 2 channel access procedure is successful:
if both the Type 1 channel access procedure and the Type 2 channel access procedure are successful, initiate a second PUSCH transmission of the plurality of PUSCH transmissions on the one or more second carriers; or
if the Type 2 channel access procedure is not successful, delay transmission on at least a third carrier of the one or more second carriers.

11. The UE of claim 10, wherein the Type 1 channel access procedure comprises a listen-before-talk (LBT) procedure associated with a variable contention window (CW) calculated independently for respective carriers of the plurality of unlicensed carriers and a backup counter based on a largest CW of respective variable CWs calculated for respective carriers of the plurality of unlicensed carriers.

12. The UE of claim 10, wherein the Type 1 channel access procedure comprises a random backoff counter.

13. The UE of claim 10, wherein the Type 2 channel access procedure comprises a fixed LBT sensing interval.

14. The UE of claim 13, wherein the fixed LBT sensing interval is set to 25 microseconds.

15. The UE of claim 10, wherein the processor is further configured to cause the UE to select the first carrier randomly from the plurality of unlicensed carriers.

16. The UE of claim 10, wherein the Type 1 channel access procedure comprises a category-4 listen-before-talk (LBT) procedure.

17. The UE of claim 10, wherein both the first PUSCH transmission and the second PUSCH transmission begin at the first PUSCH starting position.

18. The UE of claim 17, wherein the processor is further configured to cause the UE to:
  determine that the Type 2 channel access procedure is successful on a fourth carrier of the one or more second carriers; and
  in response to the determination that the Type 2 channel access procedure is successful on the fourth carrier, initiate a third PUSCH transmission of the plurality of PUSCH transmissions at the first PUSCH starting position.

19. The UE of claim 10, wherein the Type 2 channel access procedure is initiated at a same time as the Type 1 channel access procedure.

20. A method, comprising:
  receiving one or more channel access indications from one or more uplink (UL) grants from a base station scheduling a plurality of physical uplink shared channel (PUSCH) transmissions on a plurality of unlicensed carriers at a first PUSCH starting position;
  processing the one or more UL grants to identify the first PUSCH starting position for the plurality of PUSCH transmissions on the plurality of unlicensed carriers;
  processing the one or more UL grants to identify a Type 1 channel access procedure for the plurality of PUSCH transmissions on the plurality of unlicensed carriers;
  selecting a first carrier of the plurality of unlicensed carriers;
  initiating the Type 1 channel access procedure on the first carrier in response to selection of the first carrier;
  determining that the Type 1 channel access procedure is successful;
  initiating a first PUSCH transmission of the plurality of PUSCH transmissions on the first carrier of the plurality of unlicensed carriers in response to the determination that the Type 1 channel access procedure is successful;
  initiating a Type 2 channel access procedure on one or more second carriers of the plurality of unlicensed carriers, wherein the one or more second carriers do not include the first carrier, and wherein the Type 2 channel access procedure are performed immediately before the first PUSCH transmission on the first carrier;
  determining whether the Type 2 channel access procedure is successful; and
  based on the determination whether the Type 2 channel access procedure is successful:
    if both the Type 1 channel access procedure and the Type 2 channel access procedure are successful, initiating a second PUSCH transmission of the plurality of PUSCH transmissions on the one or more second carriers; or
    if the Type 2 channel access procedure is not successful, delaying transmission on at least a third carrier of the one or more second carriers.

21. The method of claim 20, wherein both the first PUSCH transmission and the second PUSCH transmission begin at the first PUSCH starting position.

22. The method of claim 21, further comprising:
  determining that the Type 2 channel access procedure is successful on a fourth carrier of the one or more second carriers; and
  in response to the determination that the Type 2 channel access procedure is successful on the fourth carrier, initiating a third PUSCH transmission of the plurality of PUSCH transmissions at the first PUSCH starting position.

* * * * *